(12) United States Patent
Kizu et al.

(10) Patent No.: US 9,781,311 B2
(45) Date of Patent: Oct. 3, 2017

(54) LIQUID CRYSTAL OPTICAL DEVICE, SOLID STATE IMAGING DEVICE, PORTABLE INFORMATION TERMINAL, AND DISPLAY DEVICE

(71) Applicant: KABUSHIKI KAISHA TOSHIBA, Minato-ku (JP)

(72) Inventors: Yuko Kizu, Yokohama (JP); Machiko Ito, Yokohama (JP); Yukio Kizaki, Kawasaki (JP); Honam Kwon, Kawasaki (JP); Hideyuki Funaki, Tokyo (JP); Kazuhiro Suzuki, Tokyo (JP); Risako Ueno, Tokyo (JP); Mitsuyoshi Kobayashi, Tokyo (JP); Hiroto Honda, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 325 days.

(21) Appl. No.: 14/206,365

(22) Filed: Mar. 12, 2014

(65) Prior Publication Data

US 2014/0285703 A1    Sep. 25, 2014

(30) Foreign Application Priority Data

Mar. 22, 2013 (JP) .................................. 2013-060361
Oct. 31, 2013 (JP) .................................. 2013-227338

(51) Int. Cl.
*G02F 1/29* (2006.01)
*G02F 1/1335* (2006.01)
(Continued)

(52) U.S. Cl.
CPC ......... *H04N 5/225* (2013.01); *G02F 1/13306* (2013.01); *G02F 1/29* (2013.01);
(Continued)

(58) Field of Classification Search
CPC .......... G02F 1/133526; G02B 27/2214; H04N 13/0404; H04N 13/0228; H04N 13/0232
See application file for complete search history.

(56) References Cited

U.S. PATENT DOCUMENTS 5,451,766 A    9/1995 Van Berkel
7,697,109 B2   4/2010 Yun et al.
(Continued)

FOREIGN PATENT DOCUMENTS

JP    7-78954       3/1995
JP    2002-214579   7/2002
(Continued)

OTHER PUBLICATIONS

U.S. Appl. No. 13/971,192, filed Aug. 20, 2013, Yuko Kizu, et al.
(Continued)

*Primary Examiner* — Nathanael R Briggs
*Assistant Examiner* — Alexander Gross
(74) *Attorney, Agent, or Firm* — Oblon, McClelland, Maier & Neustadt, L.L.P.

(57) ABSTRACT

A liquid crystal optical device includes: a first electrode unit including a first substrate transparent to light, a light-transmitting layer formed on the first substrate, and a first electrode formed on the light-transmitting layer and being transparent to light, the light-transmitting layer including recesses formed on a surface facing the first electrode, arranged in a first direction, and extending in a second direction; a second electrode unit including a second substrate, the second substrate being transparent to light, and two second electrodes formed on the second substrate, the second electrodes being arranged in the second direction and extending along the first direction; a liquid crystal layer located between the first and second electrode units; a first polarizing plate located on an opposite side of the second (Continued)

electrode unit from the liquid crystal layer; and a drive unit that applies voltages to the first and second electrodes.

5 Claims, 27 Drawing Sheets

(51) Int. Cl.
    *G02F 1/133*     (2006.01)
    *H04N 13/04*     (2006.01)
    *H04N 5/225*     (2006.01)
    *G02B 3/12*     (2006.01)
    *G02B 27/22*     (2006.01)

(52) U.S. Cl.
    CPC ............ *G02B 3/12* (2013.01); *G02B 27/2214* (2013.01); *G02F 1/133526* (2013.01); *G02F 2001/291* (2013.01); *G02F 2001/294* (2013.01); *H04N 13/0404* (2013.01)

(56) References Cited

U.S. PATENT DOCUMENTS

| | | | |
|---|---|---|---|
| 2006/0098296 A1* | 5/2006 | Woodgate | G02B 27/2214 359/642 |
| 2008/0013002 A1* | 1/2008 | Hong | G02B 3/12 349/15 |
| 2009/0091587 A1* | 4/2009 | Kim | G02F 1/134363 345/690 |
| 2010/0066812 A1* | 3/2010 | Kajihara | G02B 3/0056 348/46 |
| 2010/0181022 A1* | 7/2010 | Zuidema | G02B 3/0012 156/272.2 |
| 2011/0025675 A1* | 2/2011 | Peng | G02F 1/1323 345/211 |
| 2012/0099034 A1* | 4/2012 | Pijlman | G02B 27/2214 349/15 |
| 2014/0340292 A1 | 11/2014 | Kashiwagi et al. | |

FOREIGN PATENT DOCUMENTS

| | | |
|---|---|---|
| JP | 2007-226231 | 9/2007 |
| JP | 2008-167395 | 7/2008 |
| JP | 2009-48078 | 3/2009 |
| JP | 2014-224928 A | 12/2014 |
| WO | WO 2013/038557 A1 | 3/2013 |
| WO | WO 2013/105240 A1 | 7/2013 |

OTHER PUBLICATIONS

U.S. Appl. No. 14/197,780, filed Mar. 5, 2014, Honam Kwon, et al.

* cited by examiner

LIQUID CRYSTAL OPTICAL DEVICE, SOLID STATE IMAGING DEVICE, PORTABLE INFORMATION TERMINAL, AND DISPLAY DEVICE

CROSS REFERENCE TO RELATED APPLICATIONS

This application is based upon and claims the benefit of priority from prior Japanese Patent Applications No. 2013-060361 filed on Mar. 22, 2013 and No. 2013-227338 filed on Oct. 31, 2013 in Japan, the entire contents of which are incorporated herein by reference.

FIELD

Embodiments described herein relate generally to liquid crystal optical devices, solid state imaging devices, portable information terminals, and display devices.

BACKGROUND

Various techniques such as a technique using a reference light, and a stereo ranging technique using a plurality of cameras, are known as imaging techniques for obtaining a distance to a subject in a depth direction, in a format of two-dimensional array information. In recent years, imaging devices capable of obtaining distance information at relatively low costs have been increasingly needed to serve as newly developed input devices for consumer market.

In order to meet the needs, an imaging device with an imaging lens and a compound eye structure is proposed, which obtains images with multiple parallaxes, and prevents the degradation of resolution. The imaging device includes, for example, an imaging lens, and a plurality of optical systems serving as re-imaging optical systems arranged between the imaging lens and an imaging element. For example, a microlens array including a plurality of microlenses arranged on a flat substrate is used as the optical systems. Pixels are arranged below the microlenses, each on a position corresponding to a microlens, to obtain images through the microlenses. An image formed by the imaging lens is re-imaged on the imaging element by means of the re-imaging microlenses. The viewpoint of each individual image that is re-imaged is shifted from that of an adjacent image by the parallax according to the position of the corresponding microlens.

A distance to a subject can be estimated based on a triangulation method by image-processing the parallax images obtained from the microlenses. Furthermore, the parallax images can be combined and reconstructed as a two-dimensional image by image-processing.

Generally, the resolution of a two-dimensional image that is reconstructed from images of re-imaging optical systems is lower than that of a two-dimensional image without using the optical systems. Substantially switching whether a plurality of optical systems is used or not using a variable microlens array would lead to the switching of imaging modes; an imaging mode for obtaining a distance to a subject in depth direction and an imaging mode for obtaining a high-resolution two-dimensional image. A technique of switching the state of a liquid crystal optical device between an imaging state and a non-imaging state by applying or eliminating a voltage has been developed, in which the liquid crystal optical device including a combination of a liquid crystal lens element and a polarization controlling optical element serving as the aforementioned optical systems. However, the combination of two liquid crystal elements increases the number of components, and the thickness of the device.

Another technique is known, for deflecting the directions of light rays upward, downward, leftward, and rightward using a liquid crystal optical device including a first liquid crystal polarization element for polarizing light rays to one direction, a second liquid crystal polarization element for polarizing light rays to a direction perpendicular to the above one direction, and a liquid crystal polarization rotation element located between the first liquid crystal polarization element and the second liquid crystal polarization element. This liquid crystal optical device includes three liquid crystal optical elements that are stacked. This makes it difficult to decrease the thickness of the device.

DETAILED DESCRIPTION

A liquid crystal optical device according to an embodiment includes: a first electrode unit including a first substrate having a first surface, the first substrate being transparent to light, a light-transmitting layer formed on the first surface, and a first electrode formed on the light-transmitting layer, the first electrode being transparent to light, the light-transmitting layer including recesses formed on a surface facing the first electrode, the recesses being arranged in a first direction that is parallel to the first surface, and extending in a second direction that crosses the first direction and is parallel to the first surface; a second electrode unit including a second substrate having a second surface that faces the first surface, the light-transmitting layer and the first electrode being provided between the first substrate and the second substrate, the second substrate being transparent to light, and two second electrodes formed on the second surface of the second substrate, the second electrodes being arranged in the second direction and extending along the first direction; a liquid crystal layer located between the first electrode unit and the second electrode unit; a first polarizing plate located an opposite side of the second electrode unit from the liquid crystal layer; and a drive unit that applies voltages to the first electrode and the second electrodes.

Embodiments will now be explained with reference to the accompanying drawings.

First Embodiment

Figure 1:
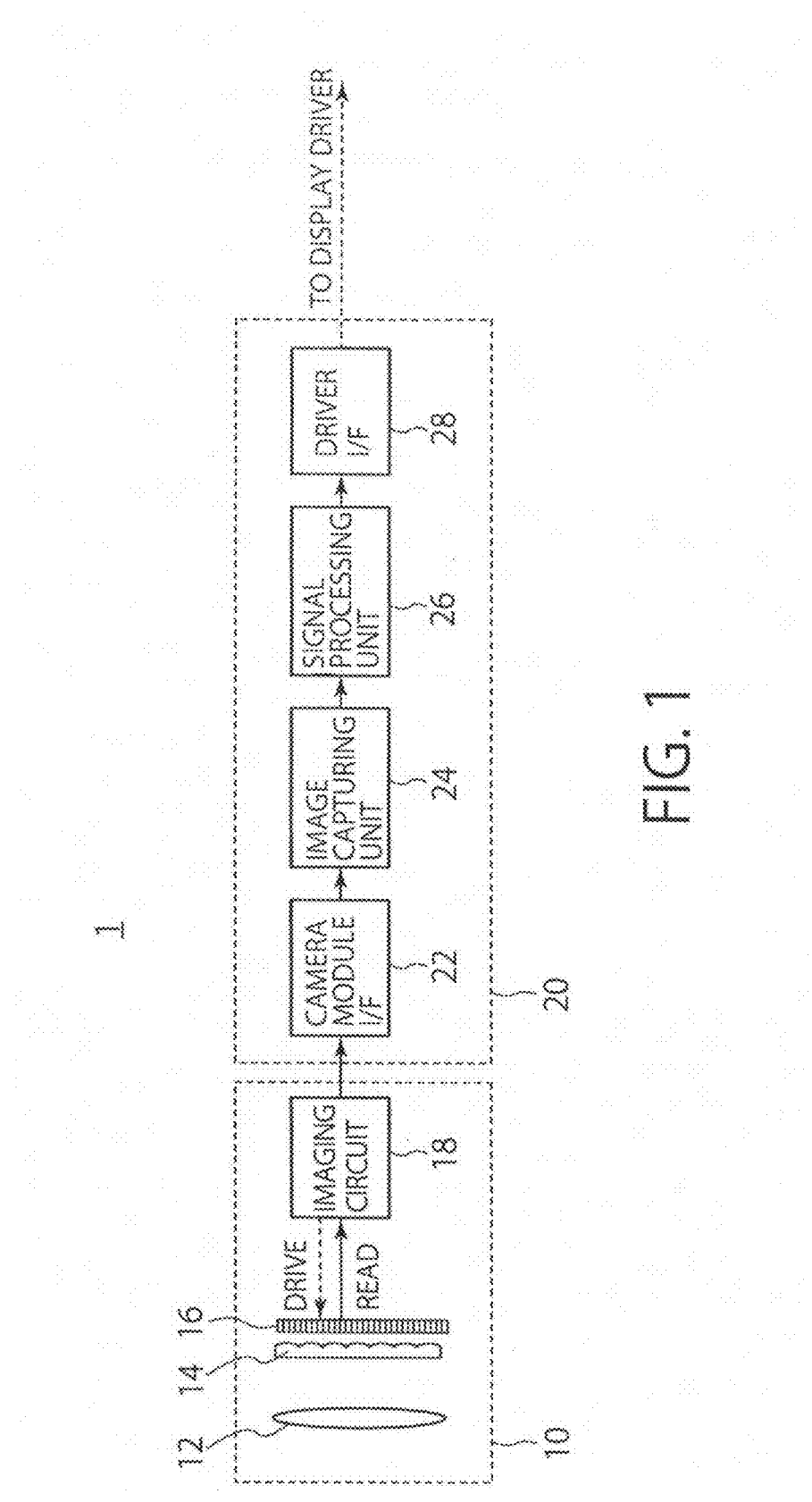
FIG. 1 is a diagram showing a solid state imaging device according to the first embodiment.

FIG. 1 shows a solid state imaging device (hereinafter also referred to as the "camera module") 1 according to the first embodiment. The solid state imaging device 1 according to the first embodiment includes an imaging module unit 10 and an imaging signal processor (hereinafter also referred to as the "ISP") 20.

The imaging module unit 10 includes an imaging optics (an imaging lens or a unit of lenses) 12, a liquid crystal optical element 14, an imaging element 16, and an imaging circuit 18. The imaging optics 12 functions as an image capturing optical system to capture light from a subject and transfer it into the imaging element 16. The imaging element 16 faces the imaging optics 12, functions as an element for converting the light captured by the imaging optics 12 to signal charges, and includes a plurality of pixels (for example, photodiodes serving as photoelectric conversion elements) arranged in a two-dimensional array form. A group of pixels form one pixel block. Specifically, the imaging element 16 includes a plurality of pixel blocks, each having a plurality of pixels. The liquid crystal optical element 14 is located between the imaging optics 12 and the imaging element 16, and has a structure in which a liquid crystal layer is located between opposing two electrodes, as will be described later. Applying a voltage to the two electrodes changes the refractive index of the liquid crystal layer, and as a result the liquid crystal optical element 14 becomes to serve as a microlens array including a plurality of microlenses. If no voltage is applied to the two transparent electrodes, the refractive index of the liquid crystal layer does not change, and light rays incident to the liquid crystal optical element 14 pass the liquid crystal optical element 14. Thus, the liquid crystal optical element 14 is capable of switching between a lens state and a non-lens state by applying or eliminating voltage. In this manner, the solid state imaging device can switch between the imaging mode in which a distance to a subject in depth direction can be obtained, and an imaging mode in which a high-resolution two-dimensional image can be obtained.

The liquid crystal optical element 14 serving as a microlens array has, for example, protrusions on a surface facing the imaging element 16 and a flat surface on the surface facing the imaging optics 12. Each of the microlenses of the liquid crystal optical element 14 corresponds to one of the pixel blocks formed on the imaging element 16, and functions as a system for reducing and refocusing light rays passing through the imaging optics 12 on a pixel block corresponding to the microlens. The light rays focused on an imaging plane by the imaging optics 12 form reduced and refocused images on the pixel blocks corresponding to the microlenses of the liquid crystal optical element.

The imaging circuit 18 includes a drive circuit unit (not shown) that drives the respective pixels of the imaging element 16, and a pixel signal processing circuit unit (not shown) that processes signals outputted from the pixels. The drive circuit unit and the pixel signal processing circuit unit may be combined to form a drive and processing circuit. In the embodiments described below, the imaging circuit 18 includes a drive and processing circuit. The drive circuit unit includes, for example, a vertical selection circuit that sequentially selects pixel units arranged on horizontal lines (rows) in a vertical direction, a horizontal selection circuit that sequentially selects pixels in units of columns, and a timing generator (TG) circuit that drives the vertical selection circuit and the horizontal selection circuit with several types of pulses. The pixel signal processing circuit unit includes such circuits as an analog-to-digital conversion circuit that converts analog electric signals from the pixel region to digital signals, a gain adjustment and amplifier circuit that performs gain adjustment and amplifying operations, and a digital signal processing circuit that corrects the digital signals.

The ISP 20 includes a camera module interface (I/F) 22, an image capturing unit 24, a signal processing unit 26, and a driver I/F 28. A RAW image obtained by an imaging operation performed by the imaging module unit 10, i.e., the RAW image obtained by the pixel signal processing circuit unit, is captured through the camera module I/F 22 into the image capturing unit 24. The signal processing unit 26 performs a signal processing operation on the RAW image captured into the image capturing unit 24. The driver I/F 28 outputs, to a display driver that is not shown, image signals having been subjected to the signal processing operation at the signal processing unit 26. The display driver displays the image formed by the solid state imaging device.

Figure 2:
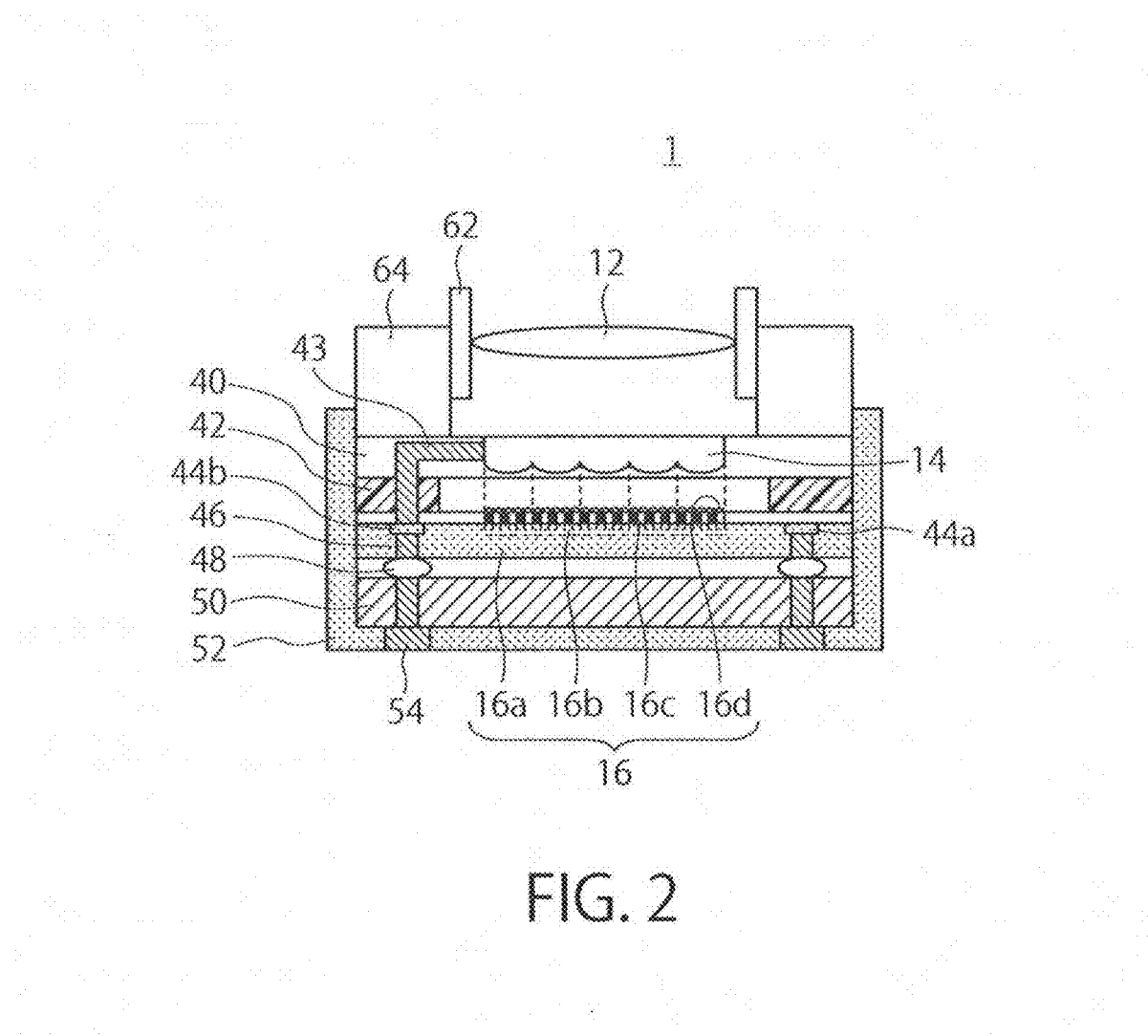
FIG. 2 is a cross-sectional view showing the solid state imaging device according to the first embodiment.

FIG. 2 shows a cross section of the solid state imaging device 1 according to the first embodiment. As shown in FIG. 2, the imaging element 16 of the solid state imaging device 1 according to the first embodiment includes a semiconductor substrate 16a, a plurality of pixels 16b, each having a photodiode, formed on the semiconductor substrate 16a, and a drive/readout circuit (not shown) for driving the pixels 16b to read signals from the pixels 16b. The imaging element 16 may further include color filters 16c located above the pixels 16b. The color filters 16c may include red (R), green (G), and blue (B) filters each corresponding to one of the pixels 16b, which are arranged in, for example, a Bayer array. The imaging element 16 may further include microlenses 16d, each corresponding to and collecting light for one of the pixels 16b, formed above the color filters 16c. The liquid crystal optical element 14 is arranged above the color filters 16c, and fixed to a liquid crystal optical element holder 40.

The liquid crystal optical element holder 40 is bonded to the semiconductor substrate 16a by, for example, a spacer 42 made of a resin that surrounds the imaging region in which the pixels 16b are arranged. The semiconductor substrate 16a is aligned and bonded with the liquid crystal optical element holder 40 using alignment markings etc.

Furthermore, the semiconductor substrate 16a has electrode pads 44a, 44b for reading the signal from the pixels 16b. Via electrodes 46 penetrating the semiconductor substrate 16c are arranged below the electrode pads 44a, 44b. The electrode pad 44b is electrically connected to the liquid crystal optical device 14 to transfer signals for driving the liquid crystal optical device 14.

The semiconductor substrate 16a is electrically connected to a chip 50 through the via electrodes 46 and bumps 48. The drive processing circuit (imaging circuit 18) for driving the imaging device to process the read signals is formed on the chip 50.

The imaging lens 12 is located above the liquid crystal optical element 14. The imaging lens 12 is fixed to a lens barrel 62 that is further fixed to a lens holder 64. The lens holder 64 is bonded onto the liquid crystal optical element holder 40. The focal length of the imaging lens 12 may be adjusted when it is fixed to the lens barrel 62 based on the relationship between the pressing force and the output image. A light-shielding cover 52 may be fixed around the semiconductor substrate 16a, the liquid crystal optical element holder 40, and the chip 50 to shield unnecessary light. Furthermore, a module electrode 54 for electrically connecting the chip 50 to the outside is provided to the light-shielding cover 52. The structure of the solid state imaging device 1 is not limited to the aforementioned one. For example, the electrode pads 44a, 44b may be electrically connected to an external chip by wire bonding.

Next, the liquid crystal optical device 14 will be described with reference to FIGS. 3 to 10.

Figure 3:
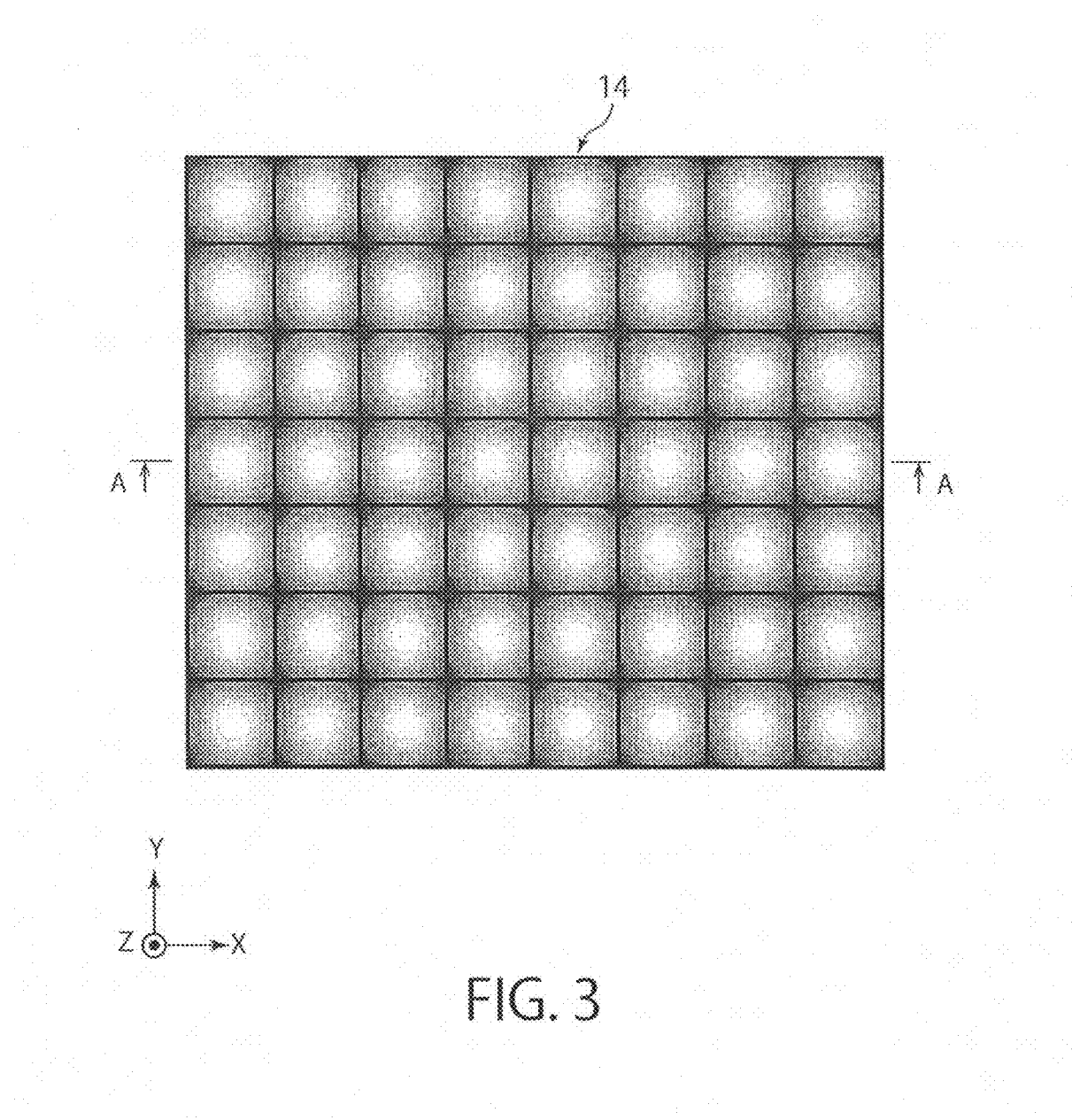
FIG. 3 is a top view of a liquid crystal optical device according to the first embodiment.

FIG. 3 shows a top surface of a specific example of a liquid crystal optical device 14 of the first embodiment. FIG. 4(a) is a cross-sectional view taken along line A-A in FIG. 3, and FIG. 4(b) is a cross-sectional view taken along line B-B in FIG. 4(a). Incidentally, FIG. 4(a) is also a cross-sectional view taken along line A-A in FIG. 4(b).

A lens unit of the liquid crystal optical device 14 includes microlenses that are squarely arranged. The liquid crystal optical device 14 also includes a pair of electrode units 14a, 14b that face each other, a liquid crystal layer 14c located between the electrode units 14a, 14b, and a polarizing plate 14d. The polarizing plate 14d is placed on a side of the electrode unit 14b opposite to the side where the liquid crystal layer 14c is located.

The electrode unit 14a includes a substrate $14a_1$ that is transparent to light, a frame unit (light-transmitting layer) $14a_2$, and an electrode $14a_3$. The substrate $14a_1$ is a planar substrate formed of, for example, quartz. The substrate $14a_1$ has a main surface (a first surface), which is assumed to be an X-Y plane. The frame unit $14a_2$ is formed on the main surface of the substrate $14a_1$, and has a plurality of recesses arranged in one direction (X-axis direction) at regular intervals. The recesses are on the side of the liquid crystal layer 14c. Each recess extends along the Y-axis direction that is perpendicular to the X-axis direction, and has a semispherical cross-section taken along the plane perpendicular to the Y-axis direction (X-Z plane), for example. More specifically, each recess has, for example, a shape of semi-cylinder extending in the Y-axis direction, and corresponds to a projection portion of a lens element when the liquid crystal optical device 14 serves as a lens. The frame unit $14a_2$ is transparent to light, and transmits visible light, for example. As will be described layer, the frame unit $14a_2$ is formed of a material to have a refractive index substantially the same as that of the liquid crystal layer 14c. Examples of such a material include a resin and silicon oxide. The electrode $14a_3$ is a film formed on the surface of the frame unit $14a_2$, the film being formed of an electrode material that is transparent to light, such as indium tin oxide (ITO). The electrode $14a_3$ includes recesses on the surface adjacent to the liquid crystal layer 14c. A film for improving the adhesion may be provided between the frame unit $14a_2$ and the electrode $14a_3$. Incidentally, the positive direction of the Z-axis is opposite to the direction of light rays incident to the liquid crystal optical device 14.

The electrode unit 14b includes a substrate $14b_1$ that is transparent to light, and electrodes $14b_4$ in stripes extending in the X-axis direction. The electrode unit 14b may further include a plane electrode $14b_2$ and an insulating film $14b_3$. The substrate $14b_1$ includes a second surface that faces the first surface of the substrate $14a_1$. For example, the first surface and the second surface are parallel to each other. The substrate $14b_1$ is a planar substrate formed of quartz, for example. The plane electrode $14b_2$ is formed on the second surface of the substrate $14b_1$. The plane electrode $14b_2$ is a planar electrode film of an electrode material such as indium tin oxide (ITO), which is formed on the substrate $14b_1$. The insulating film $14b_3$ is formed on the plane electrode $14b_2$, and electrically insulates the plane electrode $14b_2$ and the electrodes $14b_4$. The electrodes $14b_4$ are formed on the insulating film $14b_3$. The electrodes $14b_4$ face the plane electrode $14b_2$ via the insulating film $14b_3$, and overlap the plane electrode $14b_2$ at some portions. The electrodes $14b_4$ include electrodes $14b_{41}$ and electrodes $14b_{42}$ that are alternately arranged and extend in the X-axis direction. As will be describe later, when the liquid crystal optical device 14 acts as a lens, different voltages are applied to the electrodes $14b_{41}$ and the electrodes $14b_{42}$. In such a case, the distance between adjacent electrodes $14b_{41}$ with an electrode $14b_{42}$ being sandwiched therebetween serves as the pitch of lens elements. The electrode $14b_4$ may be formed of electrodes to which the same voltage is applied. The "same voltage" includes the case where the amplitudes of the voltage waveforms of two voltages are the same but the phases thereof are different. In such a case, the distance between adjacent electrodes $14b_4$ serves as the pitch of the lens elements. The plane electrode $14b_2$ can be eliminated. In such a case, the insulating film $14b_3$ is not needed, and the electrodes $14b_4$ in stripes are directly formed on the substrate $14b_1$. In any of these cases, a film for improving adhesion may be provided between the plane electrode $14b_2$ or electrodes $14b_4$ and the substrate $14b_1$. Having the plane electrode $14b_2$ to cooperate the electrodes $14b_4$ in stripes as in the first embodiment makes it easier to improve the controllability of the distribution of the electric field applied to the liquid crystal layer 14c, i.e., improve the uniformity of the electric field, thereby improving the optical characteristics of the liquid crystal optical device when a voltage is applied.

The electrode unit 14a and the electrode unit 14b are arranged so that the electrode $14a_3$ and the electrodes $14b_4$ in stripes face each other, and liquid crystal is arranged to be sandwiched between the electrode unit 14a and the electrode unit 14b. A well-known method of manufacturing a liquid crystal display device, for example, can be applied to place the liquid crystal between the electrode unit 14a and the electrode unit 14b. An alignment film (not shown) is placed between the electrode unit 14a and the liquid crystal layer 14c, and between the electrode unit 14b and the liquid crystal layer 14c.

The polarizing plate 14d is located on the surface of the liquid crystal optical device 14, to which light is incident. The polarizing plate 14d is on a side of the electrode unit 14b opposite to the side where the liquid crystal layer 14c is located. The polarizing plate 14d polarizes incident light to have a transmission axis in a direction on the X-Y plane, and allows the polarized light to be incident to the liquid crystal layer 14c. The polarizing plate 14d may be, for example, a linearly polarizing plate having an optical axis in a direction along which the electrodes $14b_4$ are arranged (Y-axis direction). The polarizing plate 14d may also be a circularly polarizing plate. Furthermore, the polarizing plate 14d may also be a linearly polarizing plate having an optical axis at an angle of 45 degrees to a direction of liquid crystal molecules in the liquid crystal layer 14c projected on a plane, for example.

The electrode $14a_3$ of the electrode unit 14a and the plane electrode $14b_2$ and the electrodes $14b_4$ of the electrode unit 14b are driven by a drive unit, which is formed on the chip 50 shown in FIG. 2 in the solid state imaging device according to the first embodiment.

One of the recesses of the first electrode unit, the two second electrodes of the second electrode unit, and the liquid crystal layer located therebetween form one lens element.

Figure 4:
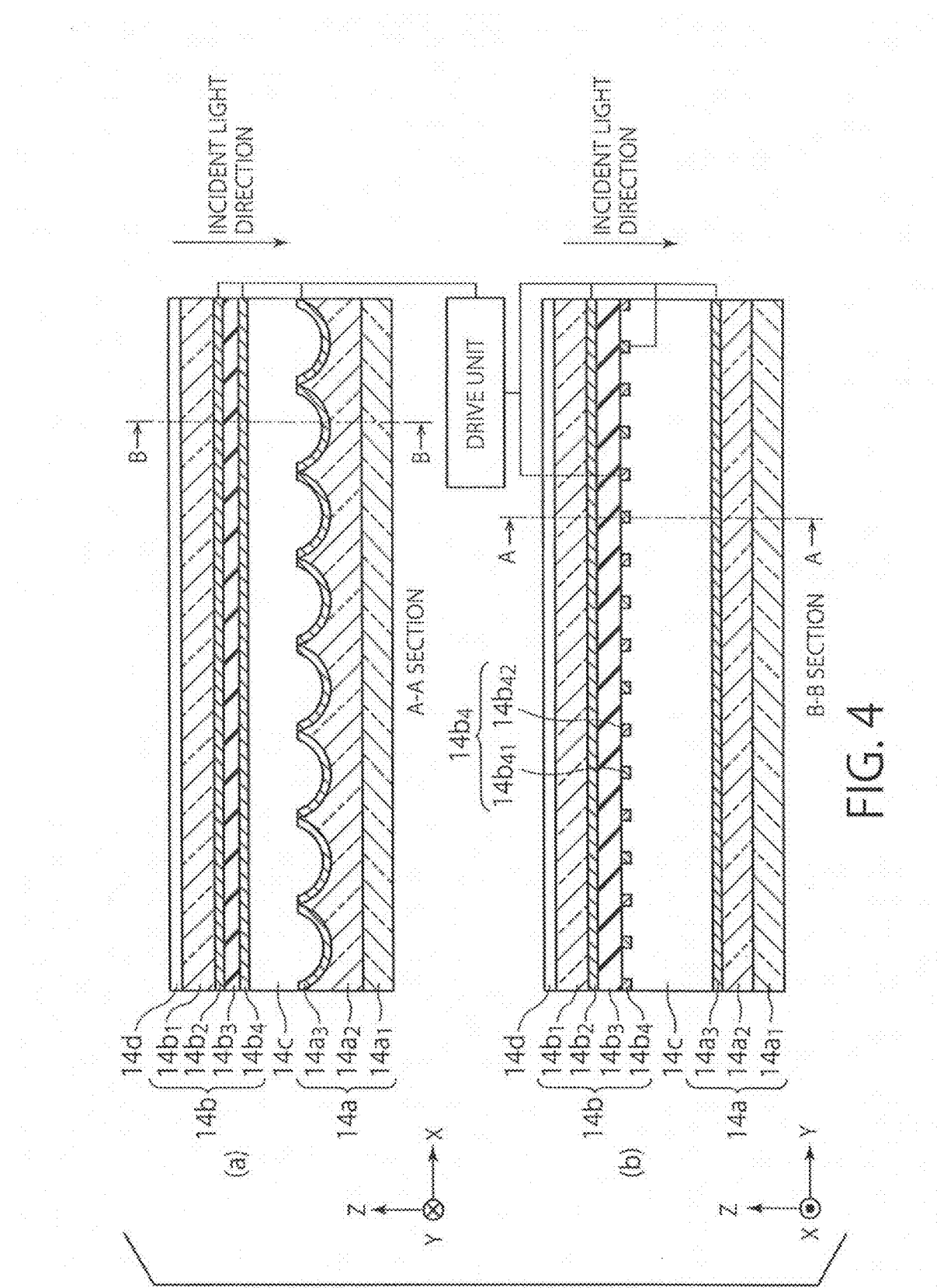
FIGS. 4(a) and 4(b) are cross-sectional views of the liquid crystal optical device according to the first embodiment.
Figure 5:
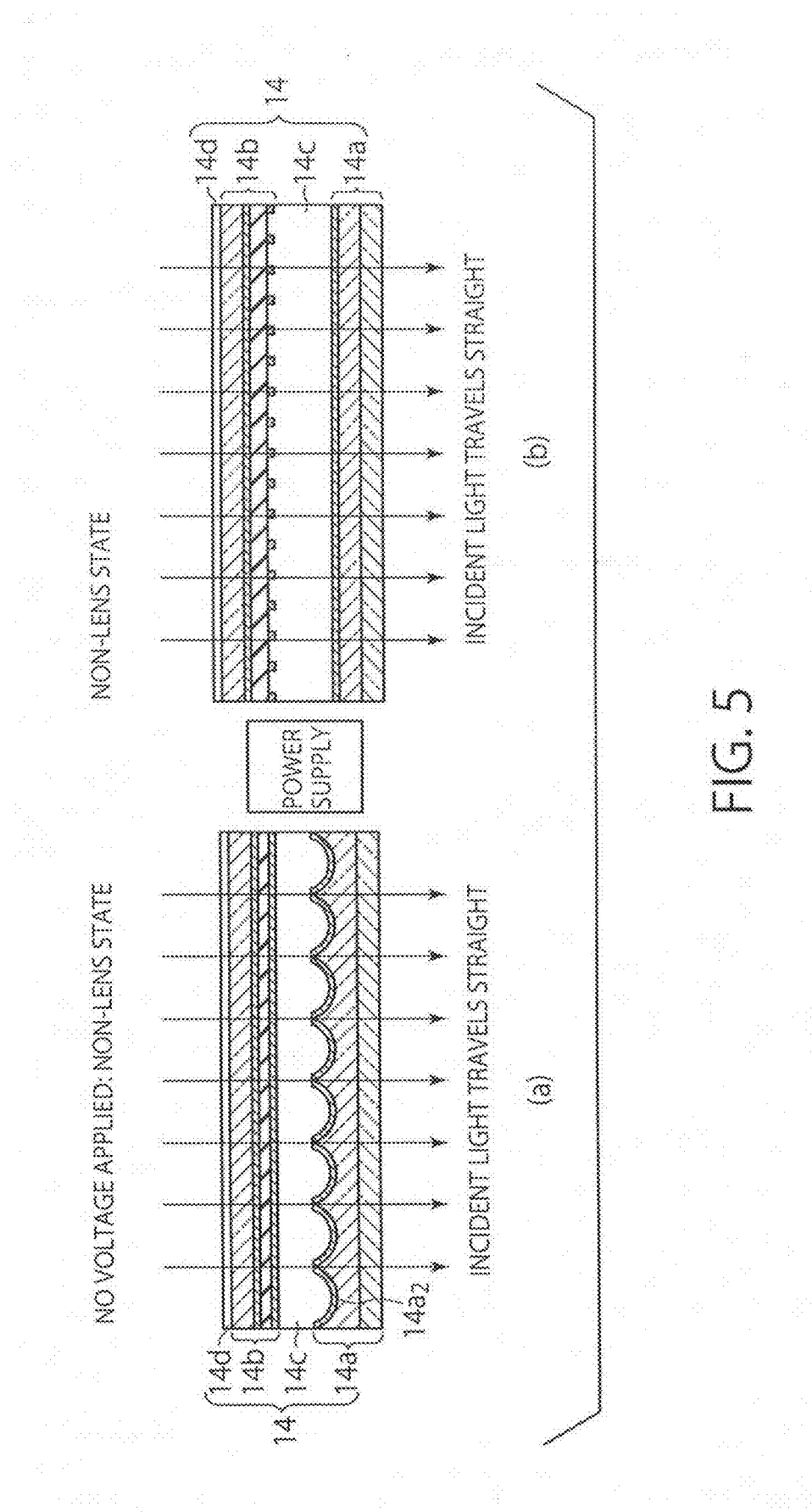
FIGS. 5(a) and 5(b) are cross-sectional views for explaining operational states of the liquid crystal optical device according to the first embodiment.
Figure 6:
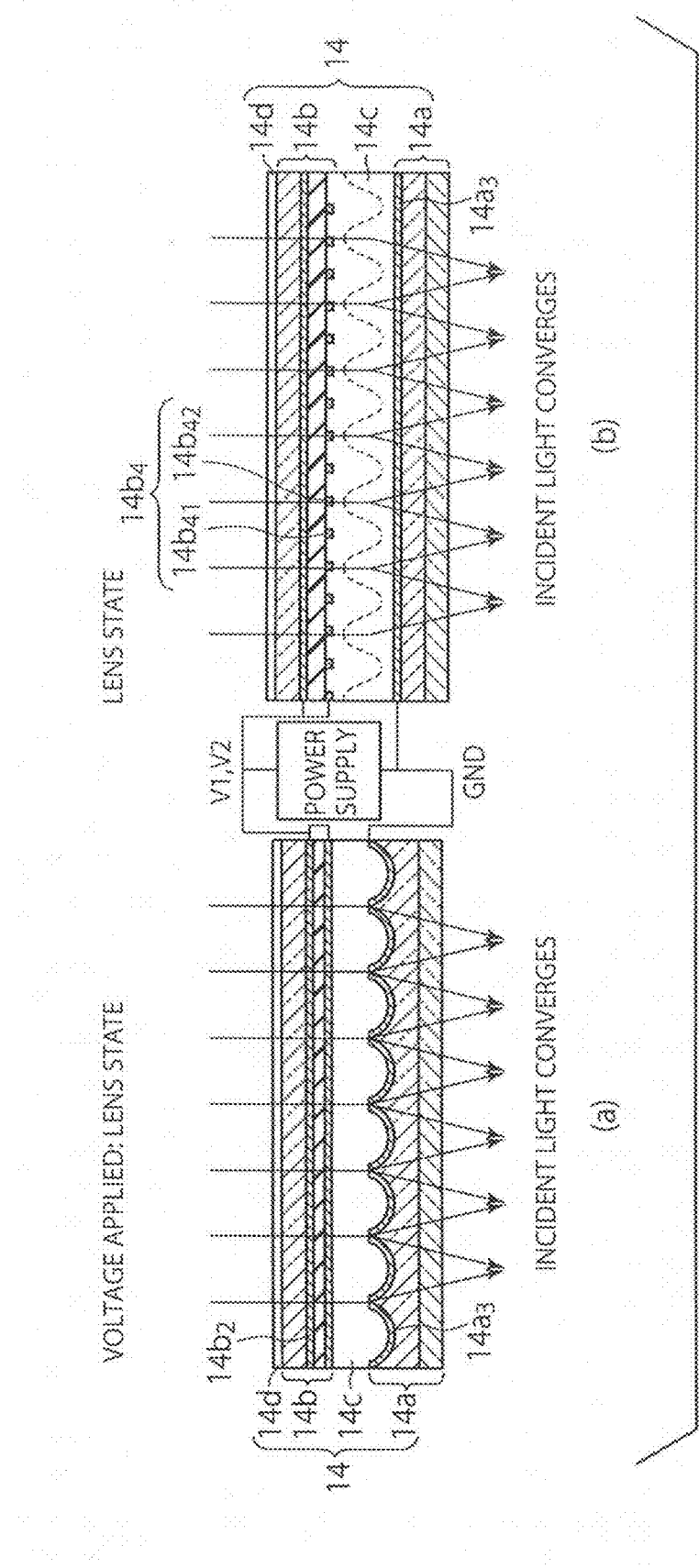
FIGS. 6(a) and 6(b) are cross-sectional views for explaining operational states of the liquid crystal optical device according to the first embodiment.

FIGS. 5(a) to 6(b) are cross-sectional views showing the operation of the liquid crystal optical device 14. FIGS. 5(a) and 5(b) show the operation corresponding to the operation shown in FIGS. 4(a) and 4(b), respectively, and FIGS. 6(a) and 6(b) also show the operation corresponding to the operation shown in FIGS. 4(a) and 4(b), respectively. FIGS. 5(a) and 5(b) show the state where no voltage is applied to the liquid crystal optical device 14, or the electrodes are not connected to the power supply, and FIGS. 6(a) and 6(b) show the state where a voltage is applied to the liquid crystal optical device 14.

As can be understood from FIGS. 5(a) and 5(b), when no voltage is applied, the liquid crystal molecules of the liquid crystal layer 14c are uniformly aligned if viewed from the plane direction. At this time, the direction of planar projection of the liquid crystal alignment is the direction in which the electrode $14b_4$ are arranged (Y-axis direction), for example. The direction of orientation of the liquid crystal alignment is, for example, the vertical direction (Z-axis direction) and the direction of planar projection is not fixed. The material of the frame unit $14a_2$ is selected in such a manner that the refractive index thereof is substantially the same as the refractive index of the liquid crystal layer 14c when no voltage is applied. As a result, the refractive index of the liquid crystal layer 14c matches that of the frame unit $14a_2$. The difference in refractive index between the frame unit $14a_2$ and the liquid crystal layer 14c when no voltage is applied is set to be 0.3 or lower, for example. As a result, light incident to the liquid crystal optical device 14 travels straight without being refracted at projecting portions of lens elements, as shown in FIG. 5(a). Since the liquid crystal molecules of the liquid crystal layer 14c are uniformly aligned in the plane as shown in FIG. 5(b), and the refractive index in the liquid crystal layer 14c is constant, the incident light travels straight. At this time, the liquid crystal optical device 14 is in a non-lens (transparent) state.

As shown in FIGS. 6(a) and 6(b), voltages V1, V2 are applied to the electrodes $14b_2$, $14b_4$ of the electrode unit 14b, respectively, and the electrode $14a_3$ of the electrode unit 14a is connected to GND. At this time, the liquid crystal molecules in the liquid crystal layer 14c are re-aligned in response to the distribution of electric field in the liquid crystal layer 14c. As a result, a refractive index distribution appears in the liquid crystal layer 14c, which makes the refractive index of the liquid crystal layer 14c different from that of the frame unit $14a_2$. Therefore, if a voltage is applied to the liquid crystal layer 14c between the plane electrode $14b_2$ of the electrode unit 14b on the incident light side and the electrode $14a_3$ of the electrode unit 14a shown in FIG. 6(a), a substantially vertical electric field distribution is generated. If the liquid crystal layer 14c is formed of a material having positive dielectric anisotropy, the liquid crystal molecules are aligned vertically. If the liquid crystal layer 14c is formed of a material having negative dielectric anisotropy, the liquid crystal molecules are aligned horizontally. As a result, the refractive index changes, and a difference in refractive index is caused between the liquid crystal layer 14c and the frame unit $14a_2$. In general, the refractive index decrease when the liquid crystal molecules are re-aligned vertically, and increases if the liquid crystal molecules are re-aligned horizontally. In this manner, the liquid crystal layer 14c acts as a lens, and focuses light passing therethrough.

If a voltage is applied to the liquid crystal layer 14c between one of the electrodes $14b_4$ ($14b_{41}$ or $14b_{42}$) of the electrode unit 14b, for example the electrodes $14b_{41}$, and the electrode $14a_3$ of the electrode unit 14a shown in FIG. 6(b), and if the liquid crystal layer 14c is formed of a material having positive dielectric anisotropy, the liquid crystal layer 14c has a cyclically changing electric field distribution which is relatively much vertical immediately above the electrodes $14b_{41}$ to which the voltage is applied, and relatively much horizontal between the electrodes $14b_{42}$ and the electrode $14a_3$ (a schematic refractive index distribution is shown by a broken line in the liquid crystal layer 14c). If the liquid crystal layer 14c is formed of a material having negative dielectric anisotropy, the liquid crystal layer 14c has a cyclically changing electric field distribution which is relatively much horizontal immediately above the electrodes $14b_{41}$ to which the voltage is applied, and relatively much vertical between the electrodes $14b_{42}$ and the electrode $14a_3$ (in this case, the refractive index distribution is shifted by half a cycle in the direction of the arrangement of the electrodes $14b_4$ in stripes (Y-axis direction) from the distribution shown in FIG. 6(b). The tilt of the liquid crystal alignment is also cyclically changed along the electric field distribution, which leads to a cyclic change in refractive index in the direction in which the electrodes $14b_4$ in stripes are arranged (Y-axis direction). As a result, the liquid crystal layer $14c$ functions as a gradient index (GRIN) lens to focus light. At this time, the liquid crystal optical device 14 is in a lens state. Thus, the liquid crystal optical device 14 is capable of switching between the lens state and the non-lens state depending on whether a voltage is applied or not.

Figure 7A:
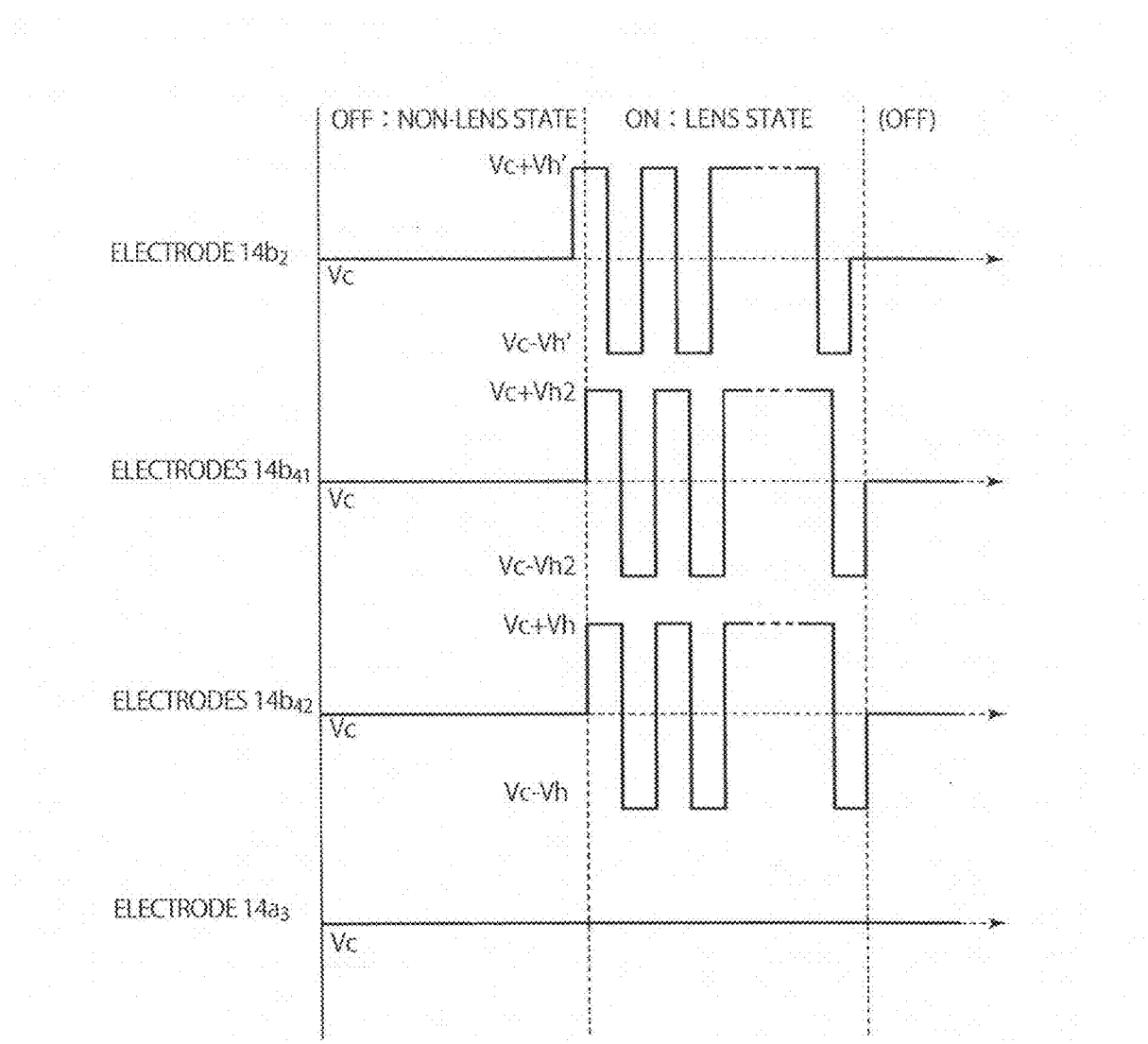
FIG. 7A is a waveform diagram showing voltages for driving the liquid crystal optical device according to the first embodiment.

FIG. 7A shows an example of voltage waveforms for driving the liquid crystal optical device 14 to be in the non-lens state and the lens state shown in FIGS. 5(a) to 6(b). The example shown in FIG. 7A uses a material having negative dielectric anisotropy to form the liquid crystal layer $14c$. FIG. 7A shows the voltage waveforms of the electrode $14a_3$ of the electrode unit $14a$, and the plane electrode $14b_2$ and the electrodes in stripes $14b_{41}$, $14b_{42}$ of the electrode unit $14b$. An alternating voltage increased or decreased by a voltage Vh' from a reference voltage Vc is applied to the plane electrode $14b_2$, an alternating voltage increased or decreased by a voltage Vh2 from the reference voltage Vc is applied to the electrode $14b_{41}$, and an alternating voltage increased or decreased by a voltage Vh from the reference voltage Vc is applied to the electrode $14b_{42}$. The voltage Vh' is equal to or more than Vh, and the voltage Vh2 is equal to or more than Vh'. The voltage Vh' corresponds to the voltage V1 applied to the liquid crystal layer $14c$ shown in FIGS. 6(a) and 6(b). The voltage Vh2 corresponds to the voltage V2 applied to the liquid crystal layer $14c$ in FIGS. 6(a) and 6(b). The voltage waveform of the plane electrode $14b_2$ is substantially in synchronization with that of the electrodes $14b_{41}$ or electrodes $14b_{42}$. Alternatively, the voltage applied to the plane electrode $14b_2$ and the electrodes $14b_{42}$ can be fixed to the constant voltage Vc. The voltages can be applied to the plane electrode $14b_2$, the electrodes $14b_{41}$, and the electrodes $14b_{42}$ in the order reverse to the case shown in FIG. 7A. Alternatively, the voltages can be simultaneously applied. In the example shown in FIG. 7A, the voltages are applied to the electrodes $14b_{41}$ and the electrodes $14b_{42}$ simultaneously. However, the timing of the application can be shifted. Furthermore, although the voltage waveforms of the voltages applied to the plane electrode $14b_2$, the electrodes $14b_{41}$, and the electrodes $14b_{42}$ shown in FIG. 7A are rectangular, any voltage having an ac waveform can be applied. An alternating voltage may be applied to the electrode $14a_3$ with a potential difference between the plane electrode $14b_2$ and the electrode $14a_3$ being kept.

Thus, the liquid crystal optical device 14 can be set in a non-lens state by eliminating a voltage to the electrode unit $14b$, and in a lens state by applying a voltage to the electrode unit $14b$.

The thickness of the electrode unit $14a$ can be made thinner than that of the electrode unit $14b$. If, for example, the diameter of the lens array is short, an image obtained by the lens array tends to be dark. In order to obtain a brighter image, it is desirable that the focal length of the microlens array be shortened and the distance between the microlens array and the imaging element be shortened. Accordingly, it is desirable that the electrode unit $14a$ be made thinner. If the electrode unit $14b$ is also made thinner, the entire device is likely to deform, which increases the risk of causing a failure when the device is mounted. Accordingly, when the electrode unit $14a$ should be made thinner, the electrode unit $14b$ is preferably made thicker than the electrode unit $14a$.

Figure 23:
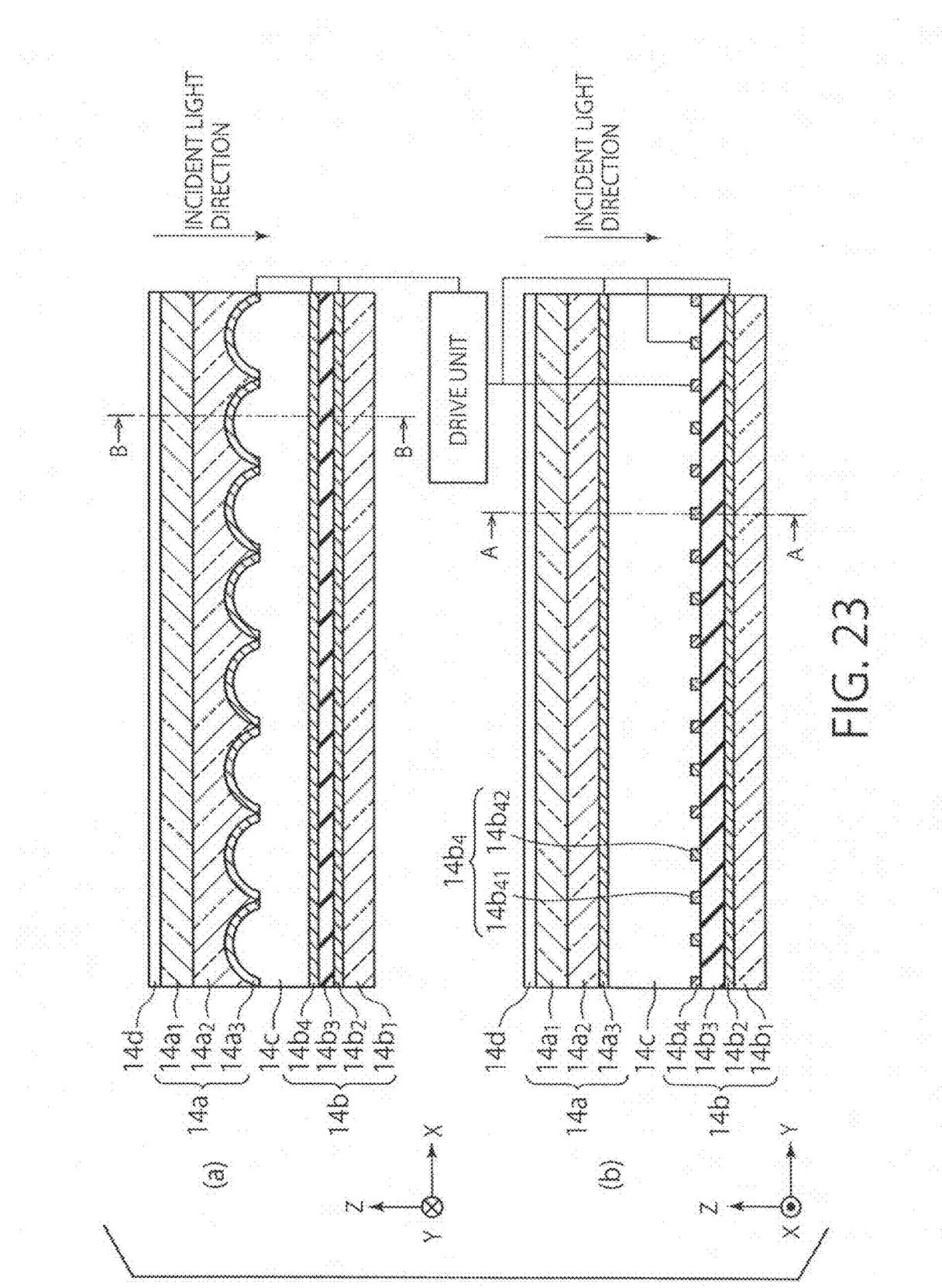
FIGS. 23(a) and 23(b) are cross-sectional views showing the liquid crystal optical device according to a modification of the first embodiment.

The liquid crystal optical device 14 may be arranged so that the electrode unit $14a$ is placed on the incident light side, and the electrode unit $14b$ faces the imaging element as shown in FIGS. 23(a) and 23(b). FIG. 23(b) is a cross-sectional view taken along line B-B of FIG. 23(a), and FIG. 23(a) is a cross-sectional view taken along line A-A of FIG. 23(b). The thickness of the electrode unit $14a$ is substantially the sum of the thickness of the substrate $14a_1$ and the thickness of the frame unit $14a_2$. Since the substrate $14a_1$ supports the frame unit $14a_2$, it may be difficult to make it thinner. On the other hand, the frame unit $14a_2$ has recesses and protrusions, and thus requires a thickness that is thicker than the depth of the recesses. If the electrode unit $14a$ is placed on the incident light side, the lens may be placed close to the imaging element by reducing the thickness of the electrode unit $14b$ (which substantially means the thickness of the substrate $14b_1$). In this case, the polarizing plate $14d$ is located at a side of the electrode unit $14a$ opposite to the side where the liquid crystal layer $14c$ is located. If the liquid crystal layer $14c$ of the liquid crystal optical device 14 shown in FIGS. 5 and 6 is formed of a material having positive dielectric anisotropy, another lens state as shown in FIG. 7B can be made.

Figure 7B:
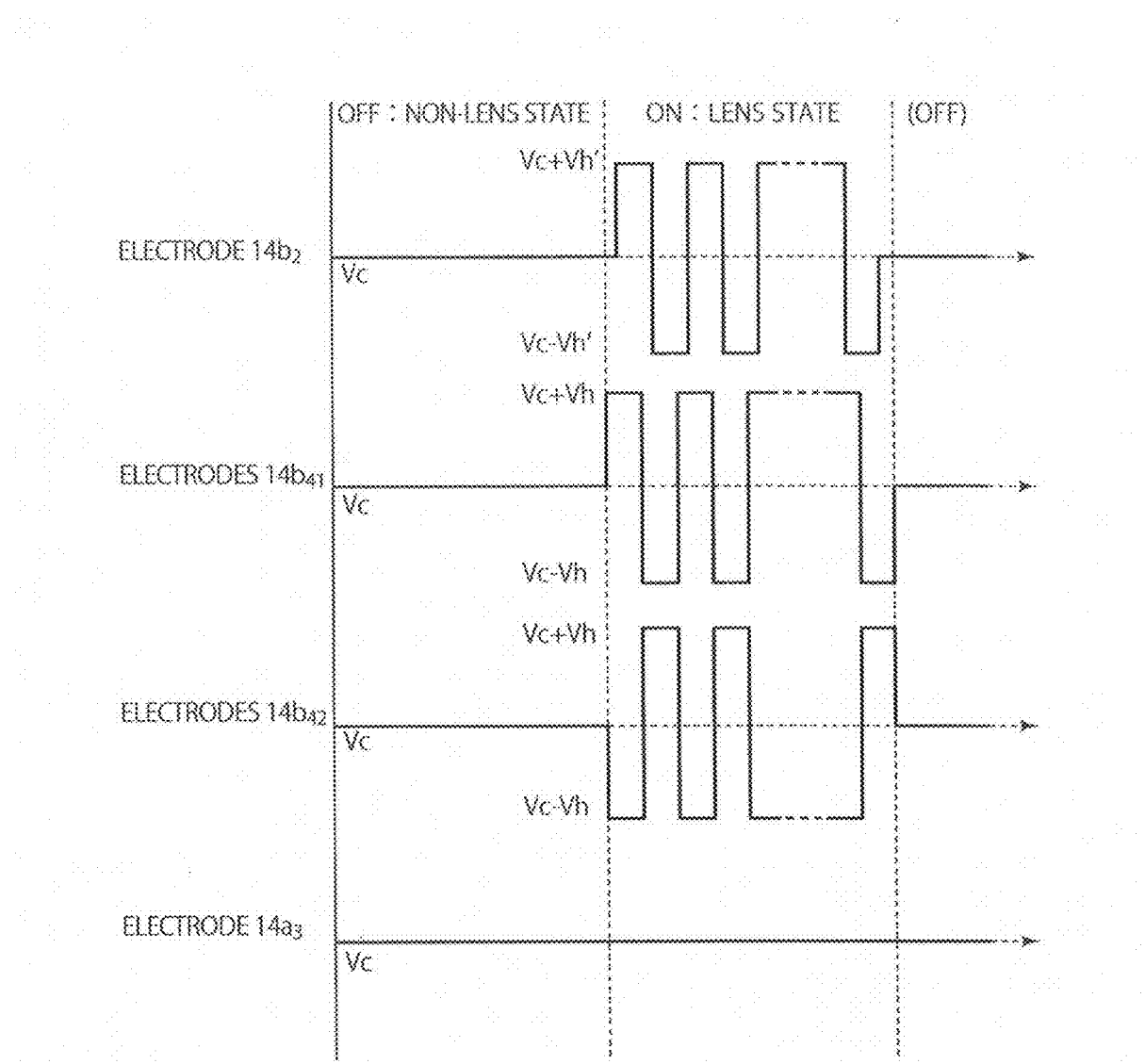
FIG. 7B is a waveform diagram showing voltages for driving a liquid crystal optical device according to a modification of the first embodiment.
Figure 8:
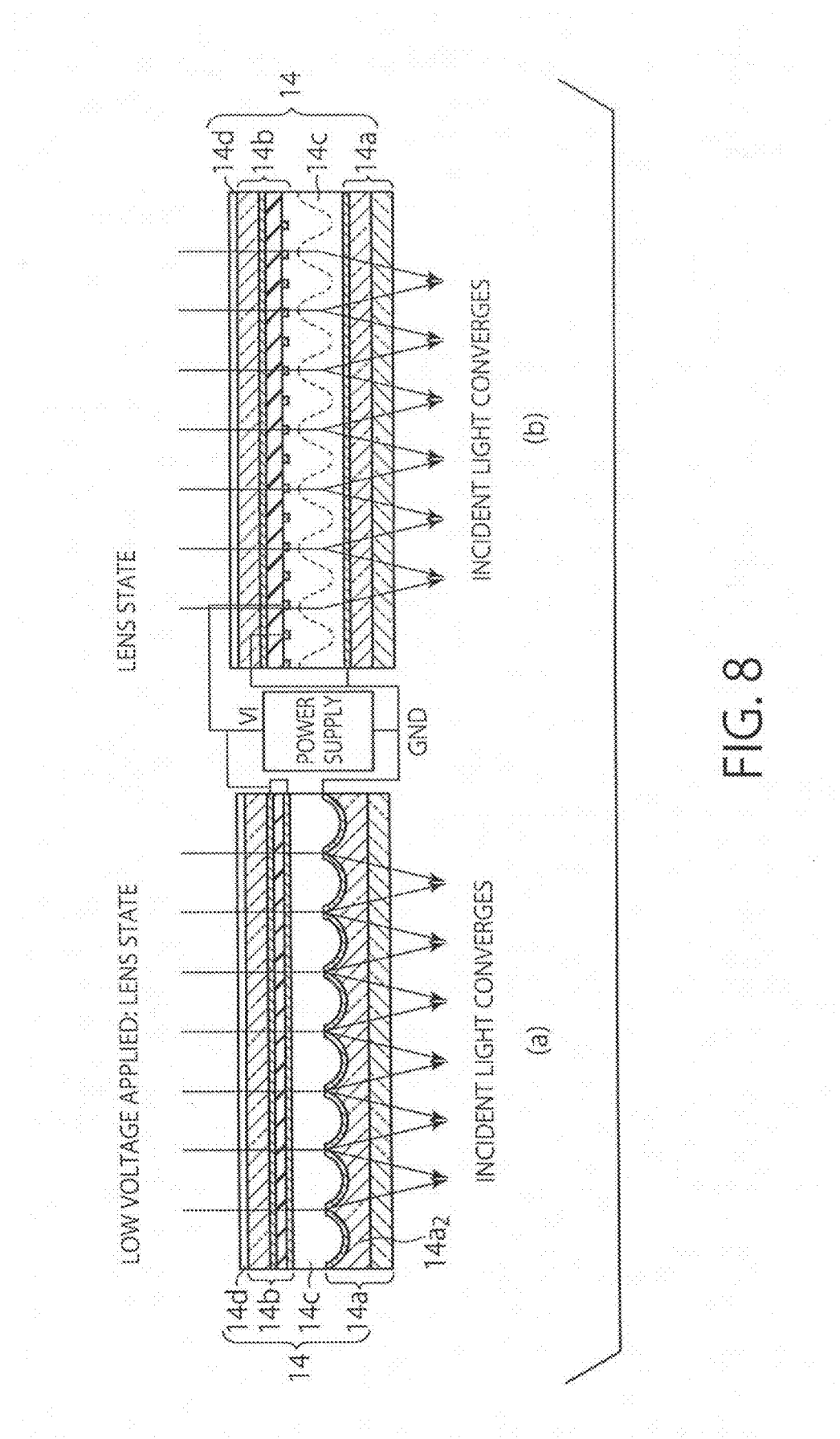
FIGS. 8(a) and 8(b) are cross-sectional views for explaining operational states of a liquid crystal optical device of a further example of the first embodiment.
Figure 9:
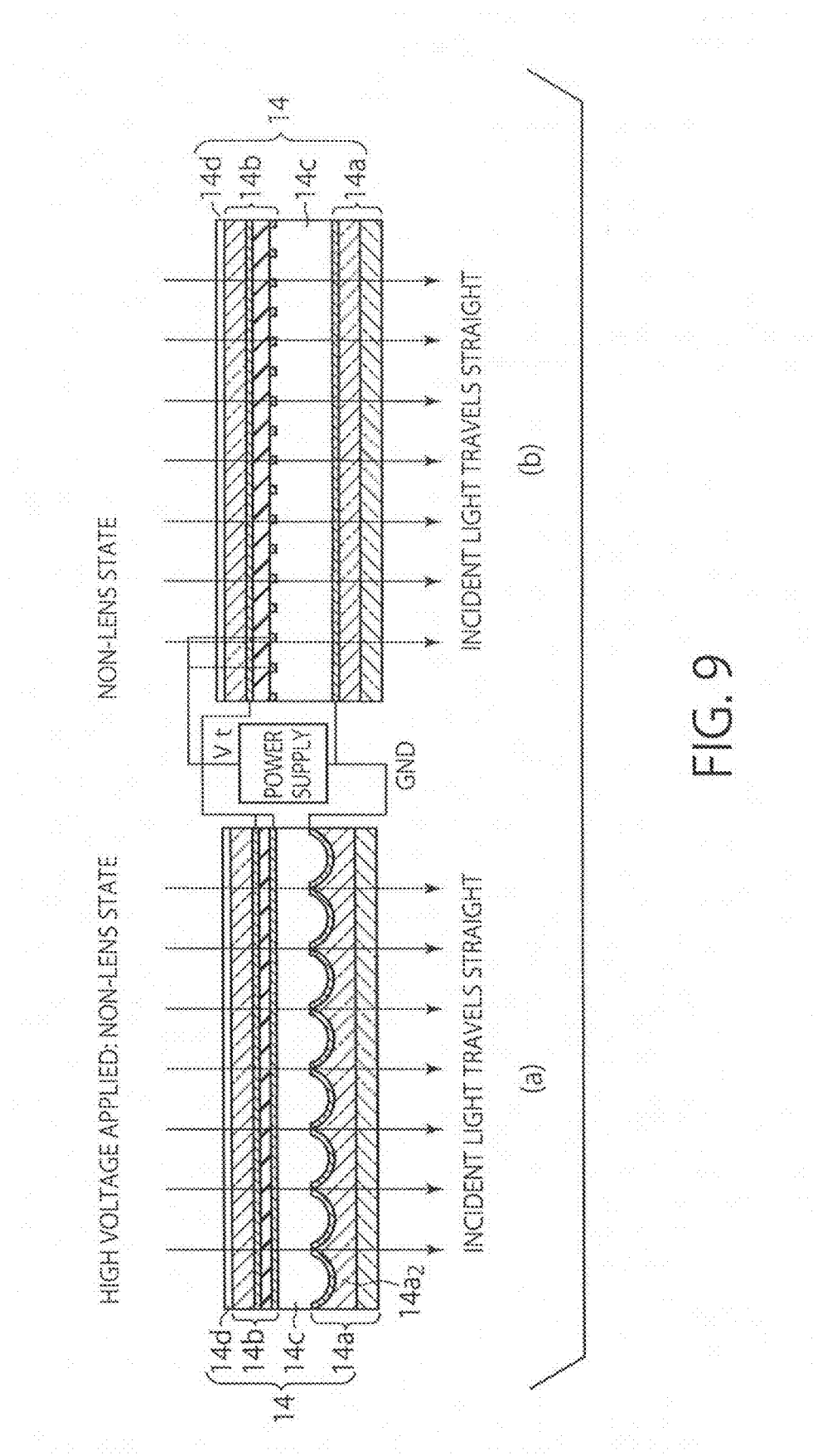
FIGS. 9(a) and 9(b) are cross-sectional views for explaining operational states of the liquid crystal optical device of the further example of the first embodiment.

FIG. 7B show voltage waveforms of the electrode $14a_3$ of the electrode unit $14a$, and the plane electrode $14b_2$ and the electrodes in stripes $14b_{41}$, $14b_{42}$ of the electrode unit $14b$. An alternating voltage increased or decreased by a voltage Vh' from a reference voltage Vc is applied to the plane electrode $14b_2$, and an alternating voltage increased or decreased by a voltage Vh from the reference voltage Vc is applied to the electrodes $14b_{41}$ and the electrodes $14b_{42}$. The voltage Vh' is equal to or more than Vh. The voltage Vh' corresponds to the voltage V1 applied to the liquid crystal layer $14c$ shown in FIGS. 6(a) and 6(b). The voltage Vh corresponds to the voltage V2 applied to the liquid crystal layer $14c$ shown in FIGS. 6(a) and 6(b). The voltage waveform of the plane electrode $14b_2$ is substantially in synchronization with one of the voltage waveforms of the electrodes $14b_{41}$ and the electrodes $14b_{42}$. Furthermore, the voltage applied to the plane electrode $14b_2$ may be fixed to the voltage Vc. The order of applying voltages to the plane electrode $14b_2$, the electrodes $14b_{41}$, and the electrodes $14b_{42}$ may be reversed to that shown in FIG. 7B. Furthermore, the voltages can be applied simultaneously. In the example shown in FIG. 7B, the voltages are applied to the electrodes $14b_{41}$ and the electrodes $14b_{42}$ simultaneously. However, the timing of applying voltage may be shifted. Furthermore, although the voltage waveforms of the plane electrode $14b_2$, the electrodes $14b_{41}$, and the electrodes $14b_{42}$ shown in FIG. 7B are rectangular, any ac waveform can be employed. An alternative voltage can be applied to the electrode $14a_3$ with a potential difference between the plane electrodes $14b_2$ and the electrode $14a_3$ being maintained.

In this example, a refractive index distribution is formed, with the same cycle as that of the recesses and protrusions of the electrode unit $14a$ shown in the cross-sectional view of FIG. 6(a). The refractive index distribution of the cross-section shown in FIG. 6(b) changes from the state indicated by the broken line. In the example shown in FIG. 7B, alternating voltages having the same amplitude and opposite polarities are applied to the electrodes $14b_{41}$ and the electrodes $14b_{42}$. At this time, the voltage at a central position between one of the electrodes $14b_{41}$ and an adjacent electrode $14b_{42}$ is substantially fixed to Vc, which is substantially same as the potential of the electrode $14a_3$ facing thereto. Accordingly, a cyclically changing electric field distribution is formed, which is relatively much vertical immediately above the electrodes $14b_{41}$ and the electrodes $14b_{42}$, and relatively much horizontal at a central portion between the electrodes $14b_{42}$ and the electrode $14a_{41}$. An alternating voltage substantially having an amplitude of 2Vh is further applied between the electrodes $14b_{42}$ and the electrode $14a_{41}$. Accordingly, an electric field distribution is formed, in which the liquid crystal layer $14c$ has even much horizontal alignment between the electrodes $14b_{42}$ and the electrode $14a_{41}$, in particular near the electrode unit $14b$. Thus, a refractive index distribution is formed in the cross-sectional view shown in FIG. 6(b), in which the refractive index is relatively low immediately above the electrodes $14b_{41}$ and the electrodes $14b_{42}$, and relatively high at central positions between the electrodes $14b_{41}$ and the electrodes $14b_{42}$.

If the liquid crystal in the liquid crystal layer $14c$ has negative dielectric anisotropy, the application of the voltage waveforms shown in FIG. 7B results in a distribution in which the refractive index is relatively high immediately above the electrodes $14b_{41}$ and the electrodes $14b_{42}$ and relatively low at central positions between the electrodes $14b_{41}$ and the electrodes $14b_{42}$.

Further Specific Example

A further specific example of the liquid crystal optical device 14 will be described with reference to FIGS. 8(a) to 9(b) showing the case where a material having positive dielectric anisotropy is used to form the liquid crystal layer $14c$.

FIGS. 8(a) and 8(b) show the operation corresponding to the cross-sectional views shown in FIGS. 4(a) and 4(b), respectively, and FIGS. 9(a) and 9(b) also show operations corresponding to the cross-sectional views shown in FIGS. 4(a) and 4(b), respectively. FIGS. 8(a) and 8(b) show the operation in the case where a relatively low voltage Vl is applied to the liquid crystal optical device 14, and FIGS. 9(a) and 9(b) show the operation in the case where a relatively high voltage Vt is applied to the liquid crystal optical device 14.

The liquid crystal optical device 14 according to this further specific example is in the lens state when the relatively low voltage Vl is applied to the electrodes of the electrode unit $14b$, as can be understood from FIGS. 8(a) and 8(b). At this time, a mismatch in refractive index is caused between the liquid crystal layer $14c$ and the frame unit $14a_2$ in the cross-section shown in FIG. 8(a), and a refractive index distribution is formed by a cyclic change in alignment of the liquid crystal in the liquid crystal layer $14c$ in the cross-section shown in FIG. 8(b). However, the alignment of the liquid crystal in the vicinity of the frame unit $14a_2$ has not been changed yet.

The liquid crystal optical device 14 is in the non-lens state when the relatively high voltage Vt is applied to the electrodes of the electrode unit $14b$ as shown in FIGS. 9(a) and 9(b). In the state shown in FIG. 9(a), the alignment of the liquid crystal in the liquid crystal layer $14c$ changes even in the vicinity of the frame unit $14a_2$, and the refractive index of the liquid crystal layer $14c$ matches that of the frame unit $14a_2$. In the state shown in FIG. 9(b), an electric field substantially perpendicular to the electrode units $14a$, $14b$ is generated to uniformly align the liquid crystal in the liquid crystal layer $14c$.

Figure 10:
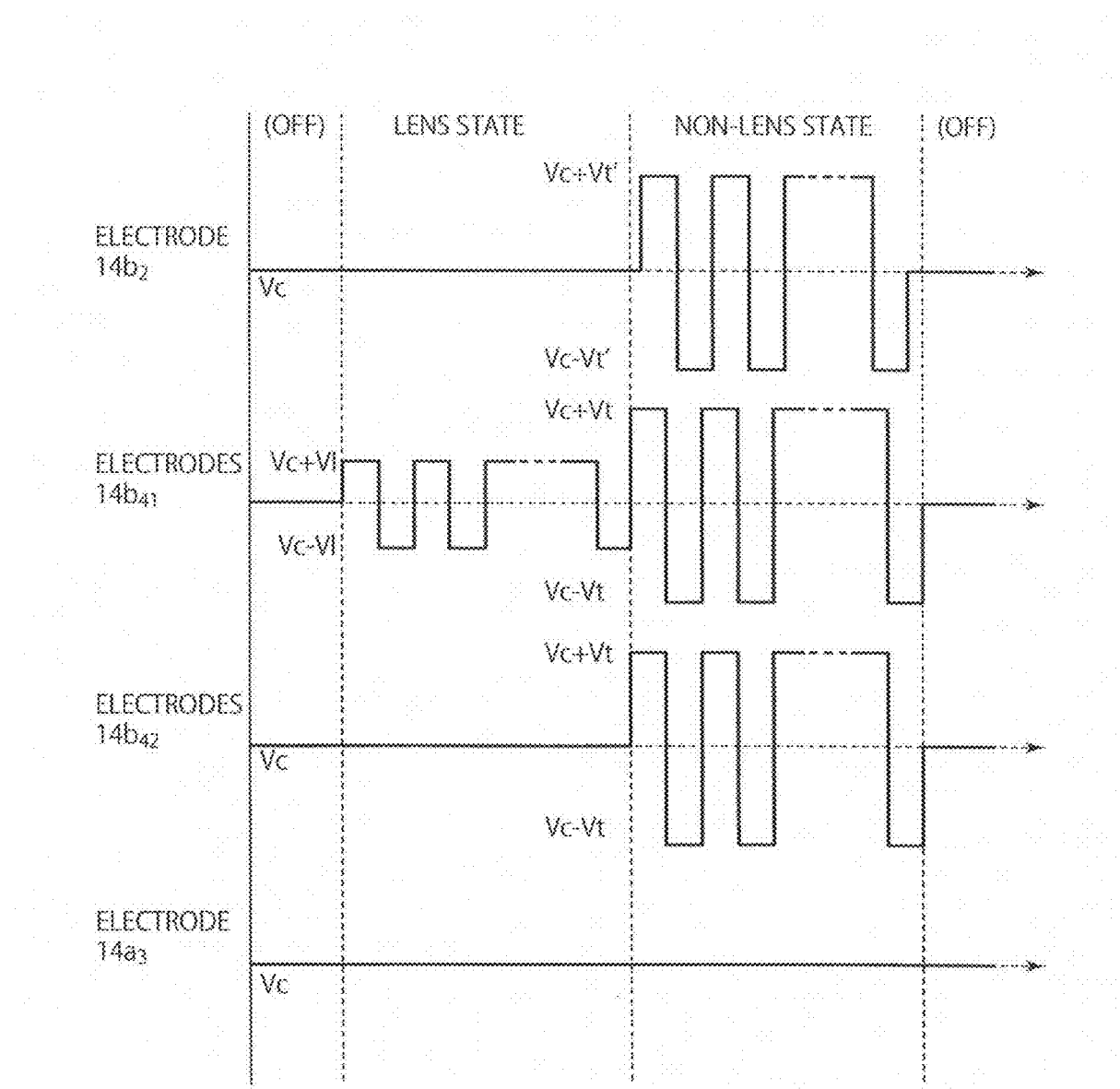
FIG. 10 is a waveform diagram showing an example of voltages for driving the liquid crystal optical device in the further example.

FIG. 10 shows an example of the voltage waveforms for making the lens state and the non-lens state shown in FIGS. 8(a) to 9(b). FIG. 10 shows voltage waveforms of the electrode $14a_3$ of the electrode unit $14a$, and the plane electrode $14b_2$ and the electrodes in stripes $14b_{41}$, $14b_{42}$ of the electrode unit $14b$. An alternating voltage increased or decreased by a voltage Vt' from a reference voltage Vc is applied to the plane electrode $14b_2$, and an alternating voltage increased or decreased by a voltage Vt from the reference voltage Vc is applied to the electrodes $14b_{41}$ and the electrodes $14b_{42}$. The voltage Vt' is equal to or more than Vt, and the voltage Vt is more than Vl. The voltage waveform of the plane electrode $14b_2$ is substantially in synchronization with that of either of the electrodes $14b_{41}$ and the electrode $14b_{42}$.

Thus, the liquid crystal optical device 14 can be brought into the lens state by applying a first voltage to the electrode unit $14b$, and into the non-lens state by applying a second voltage that is higher than the first voltage to the electrode unit $14b$.

The second voltage can be equal to or more than twice the first voltage, for example. The value of the second voltage is preferably set depending on the material of the liquid crystal layer $14c$, and can be, for example, equal to or less than 50 times the first voltage.

The order of applying voltages to the plane electrode $14b_2$, the electrodes $14b_{41}$, and the electrodes $14b_{42}$ can be reversed to the order shown in FIG. 10. Furthermore, the voltages can be simultaneously applied. In the case shown in FIG. 10, the voltages are simultaneously applied to the electrodes $14b_{41}$ and the electrodes $14b_{42}$, but the timing of applying voltage can be shifted. Furthermore, in the case shown in FIG. 10, the voltage waveforms for the plane electrode $14b_2$, the electrodes $14b_{41}$, and the electrodes $14b_{42}$ are rectangular. However, any voltage having an ac waveform can be applied. Furthermore, in the lens state, an alternating voltage may be applied to the electrode $14a_3$, the electrodes $14b_{42}$, and the electrode $14a_3$ with a potential difference with these and the electrode $14b_{41}$ being kept. Moreover, in the non-lens state, an alternating voltage may be applied to the electrode $14a_3$ with a potential difference between the plane electrode $14b_2$ and the electrode $14a_3$ being kept.

In the liquid crystal optical device 14 in the further specific example, the liquid crystal layer $14c$ has positive dielectric anisotropy. If the liquid crystal layer $14c$ has negative dielectric anisotropy, the refractive index distribution is shifted from that shown in FIG. 8(b) by half a cycle in the direction of arrangement of the electrodes $14b_4$ in stripes (Y-axis direction).

As described above, according to the first embodiment and its modifications, a liquid crystal optical device and a solid-state imaging device having a function of switching between an imaging mode for obtaining a distance to a subject in a depth direction and an imaging mode for obtaining a high-resolution two-dimensional image.

Second Embodiment

Figure 11:
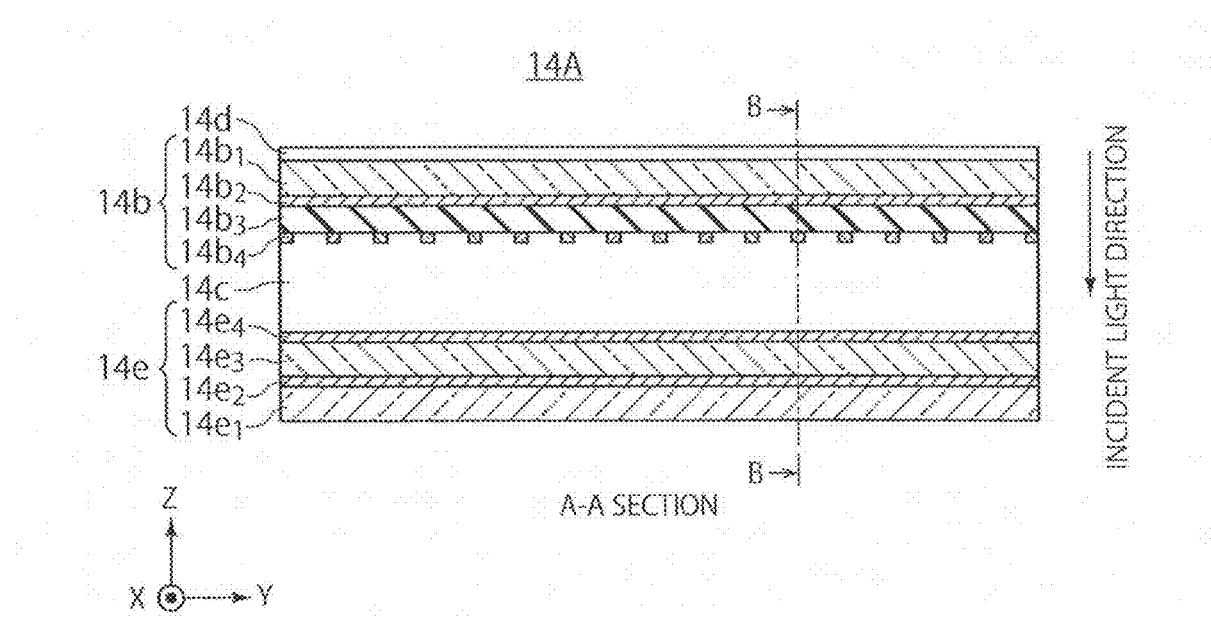
FIG. 11 is a cross-sectional view of a liquid crystal optical device according to the second embodiment.
Figure 12:
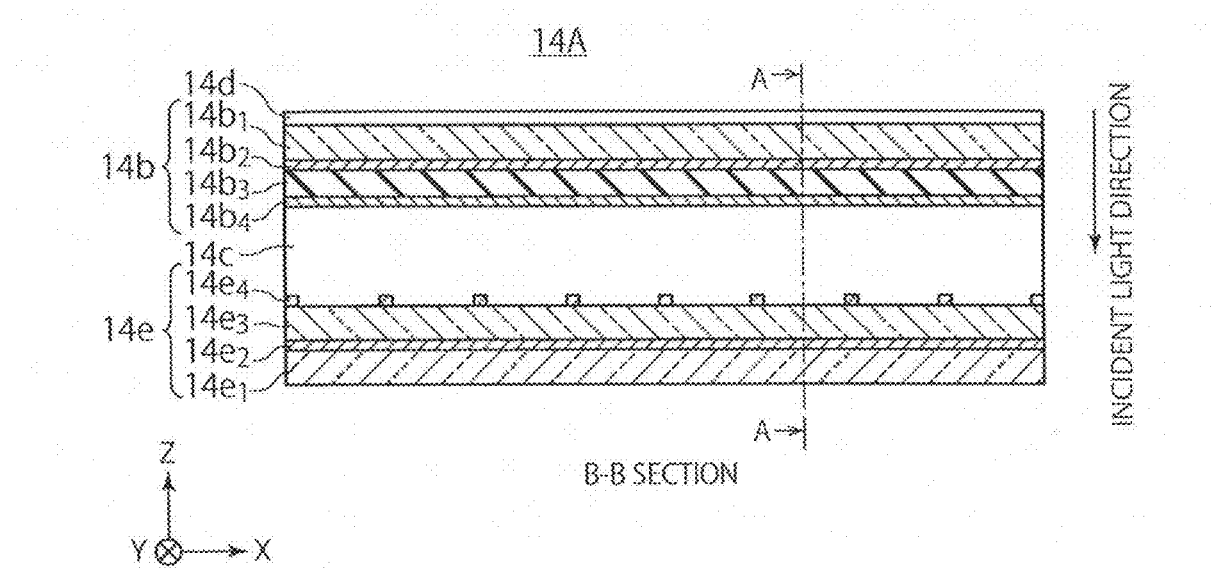
FIG. 12 is a cross-sectional view of the liquid crystal optical device according to the second embodiment.

A solid state imaging device according to the second embodiment will be described with reference to FIGS. 11 to 14. The solid state imaging device according to the second embodiment differs from the solid state imaging device according to the first embodiment in the structure of the liquid crystal optical device 14. FIGS. 11 and 12 show a liquid crystal optical device 14A used in the solid state imaging device according to the second embodiment. FIGS. 11 and 12 correspond to the cross-sectional views of FIGS. 4 and 5 showing the liquid crystal optical device 14 of the first embodiment, respectively. FIG. 11 is a cross-sectional view taken along line A-A in FIG. 12, and FIG. 12 is a cross-sectional view taken along line B-B in FIG. 11.

The liquid crystal optical device 14A according to the second embodiment is obtained by replacing the electrode unit 14a of the liquid crystal optical device 14 according to the first embodiment with an electrode unit 14e. The electrode unit 14e includes a substrate $14e_1$ that is transparent to light, a plane electrode $14e_2$, an insulating film $14e_3$, and electrodes $14e_4$ in stripes extending in the X-axis direction. The substrate $14e_1$ transparent to light is a flat substrate formed of, for example, quartz. The plane electrode $14e_2$ is formed of a light-transmitting electrode material, for example indium tin oxide (ITO), and located on the substrate $14e_1$. The insulating film $14e_3$ is formed on the plane electrode $14e_2$ to electrically insulate the plane electrode $14e_2$ from the electrode $14e_4$. The electrodes $14e_4$ are formed on the insulating film $14e_3$. In the liquid crystal optical device 14A shown in FIGS. 11 and 12, the electrodes $14e_4$ in stripes only include electrodes of the same type, to which a common voltage is applied. However, as described in the descriptions of the first embodiment, the electrodes $14e_4$ may include different types of electrodes, to which different voltages are applied. This can also be said for the electrodes $14b_4$ of the electrode unit 14b. Furthermore, the plane electrode $14e_2$ can be eliminated. In such a case, the insulating film $14e_3$ is not needed, and the electrodes $14e_4$ in stripes are directly formed on the substrate $14e_1$. In any case, a film for improving the adhesion may be provided between the plane electrode $14e_2$ or the electrodes $14e_4$ and the substrate $14e_1$. The distribution of the electric field applied to the liquid crystal layer 14c can be controlled more easily, i.e., the uniformity of the electric field can be improved more easily, if the plane electrode $14e_2$ is provided to cooperate with the electrodes $14e_4$ in stripes as in the second embodiment. As a result, the optical characteristics of the liquid crystal optical device when a voltage is applied thereto can be improved. For this reason, the electrode unit 14e includes the plane electrode $14e_2$ and the electrodes $14e_4$ in stripes instead of the frame unit $14a_2$ and the electrode $14a_3$ of the electrode unit 14a in the first embodiment. An alignment film (not shown) is provided between the electrode unit 14e and the liquid crystal layer 14c, and the electrode unit 14b and the liquid crystal layer 14c.

Figure 13:
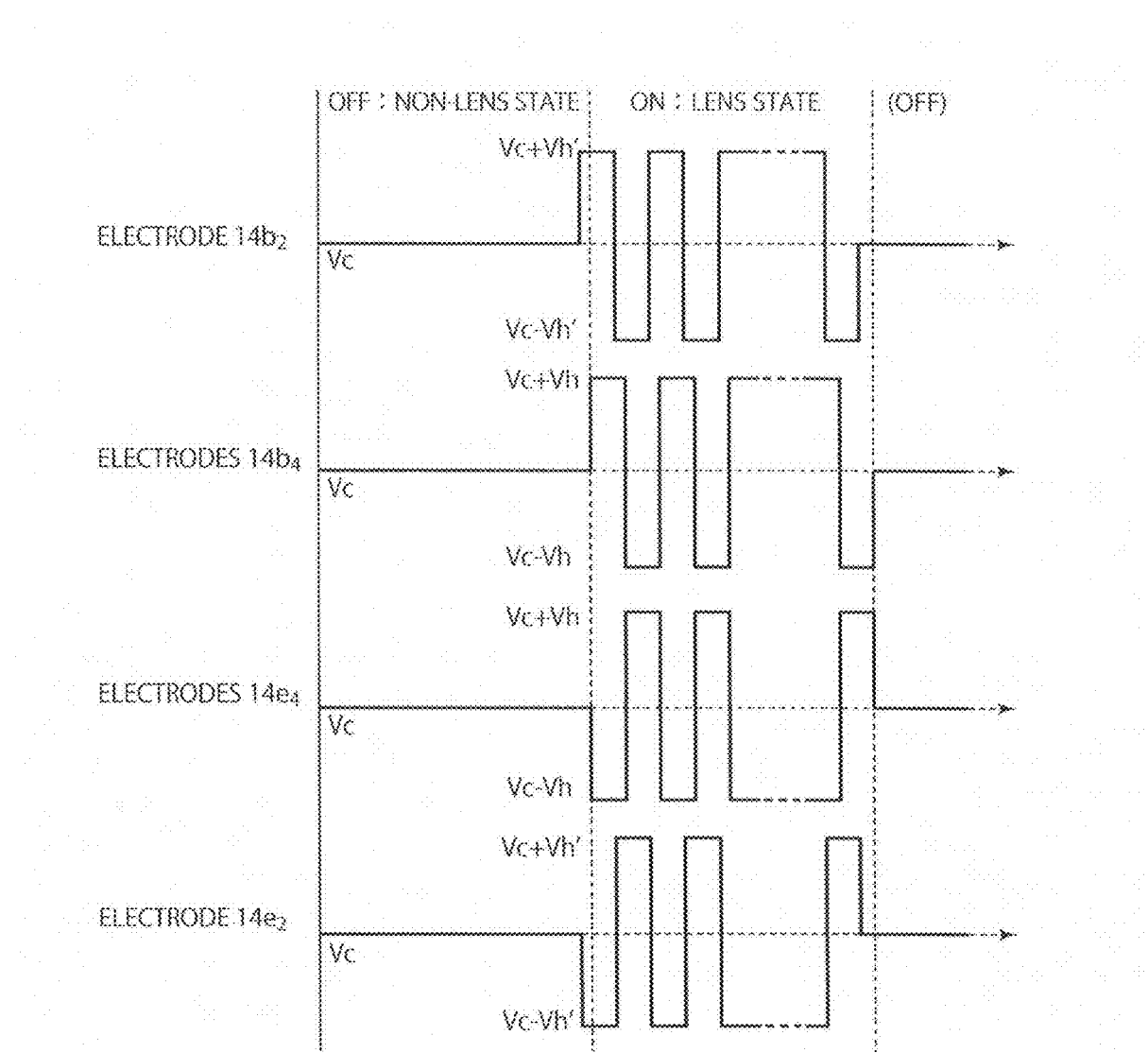
FIG. 13 is a waveform diagram showing an example of voltages for driving the liquid crystal optical device according to the second embodiment.

FIG. 13 shows an example of the voltage waveforms for driving the liquid crystal optical device 14A according to the second embodiment. The voltage waveforms of the plane electrode $14b_2$ and the electrodes $14b_4$ in stripes of the electrode unit 14b and the plane electrode $14e_2$ and the electrodes $14e_4$ in stripes of the electrode unit 14e are shown in FIG. 13. An alternating voltage increased or decreased by a voltage Vh' from a reference voltage Vc is applied to the plane electrode $14b_2$ and the plane electrode $14e_2$, and an alternating voltage increased or decreased by a voltage Vh from the reference voltage Vc is applied to the electrodes $14b_4$ and the electrodes $14e_4$. The amplitude of the voltage applied to the liquid crystal layer 14c is ±2Vh. The voltage Vh' is equal to or more than Vh. The order of applying voltages to the plane electrode $14b_2$, the plane electrode $14e_2$, the electrodes $14b_4$, and the electrodes $14e_4$ can be reversed to that shown in FIG. 13. Furthermore, voltages can be simultaneously applied. In the case shown in FIG. 13, voltages are applied to the plane electrode $14b_2$ and the plane electrode $14e_2$ simultaneously. However, the timing of applying voltage can be shifted. Furthermore, voltages are applied to the electrodes $14b_4$ and the electrodes $14e_4$ simultaneously, but the timing of applying voltage can be shifted. Although the voltage waveforms of the voltages applied to the plane electrode $14b_2$, the plane electrode $14e_2$, the electrodes $14b_4$, and the electrodes $14e_4$ are rectangular in the case shown in FIG. 13, any voltage having an ac waveform can be applied.

The plane electrode $14b_2$ of the electrode unit 14b and the electrodes $14e_4$ in stripes of the electrode unit 14e cause the liquid crystal layer 14c to function as a liquid crystal gradient index (GRIN) lens in the cross section shown in FIG. 12. Furthermore, the plane electrode $14e_2$ of the electrode unit 14e and the electrodes $14b_4$ in stripes of the electrode unit 14b cause the liquid crystal layer 14c to function as a liquid crystal GRIN lens in the cross section shown in FIG. 11. Thus, applying or eliminating a voltage can switch the lens state and the non-lens state of the liquid crystal optical device 14A.

Figure 14:
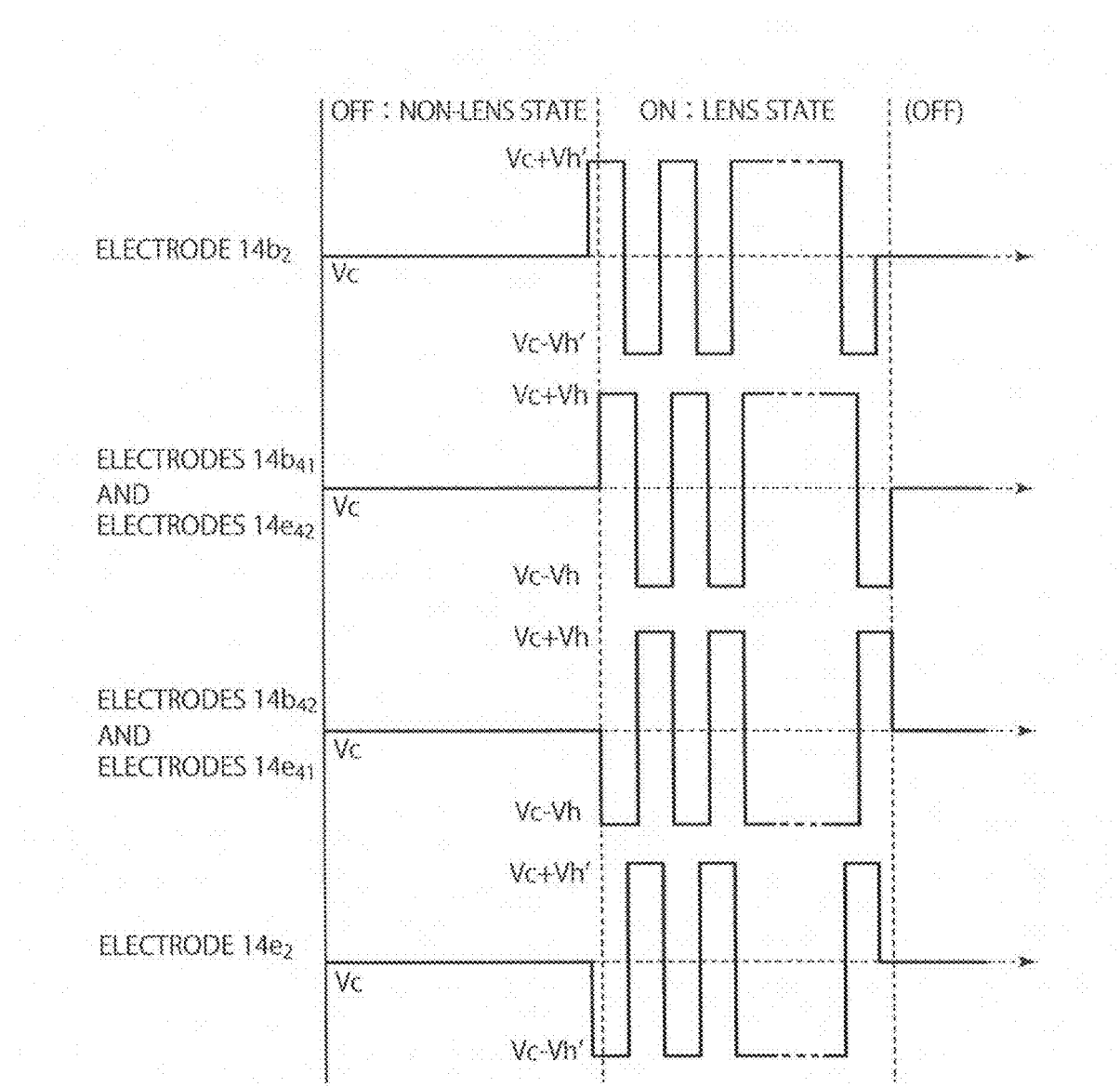
FIG. 14 is a waveform diagram showing an example of voltages of a liquid crystal optical device according to the second embodiment.

FIG. 14 shows the driving voltage waveforms in a case where the electrodes $14b_4$ in stripes of the electrode unit 14b include two types of electrodes $14b_{41}$ and electrodes $14b_{42}$ in stripes, to which difference voltages are applied, as in the case shown in FIG. 4(b), and the electrodes $14e_4$ in stripes of the electrode unit 14e include two types of electrodes $14e_{41}$ and electrodes $14e_{42}$ in stripes, to which different voltages are applied.

The liquid crystal optical device 14A according to the second embodiment does not need a frame unit, and thus can be manufactured by a simpler method. Furthermore, the employment of the aforementioned structure improves the straightness in the movement of light when no voltage is applied.

As described above, a liquid crystal optical device and a solid state imaging device according to the second embodiment, like the first embodiment, has a function of switching between an imaging mode for obtaining a distance to a subject in a depth direction and an imaging mode for obtaining a high-resolution two-dimensional image.

Third Embodiment

Figure 15:
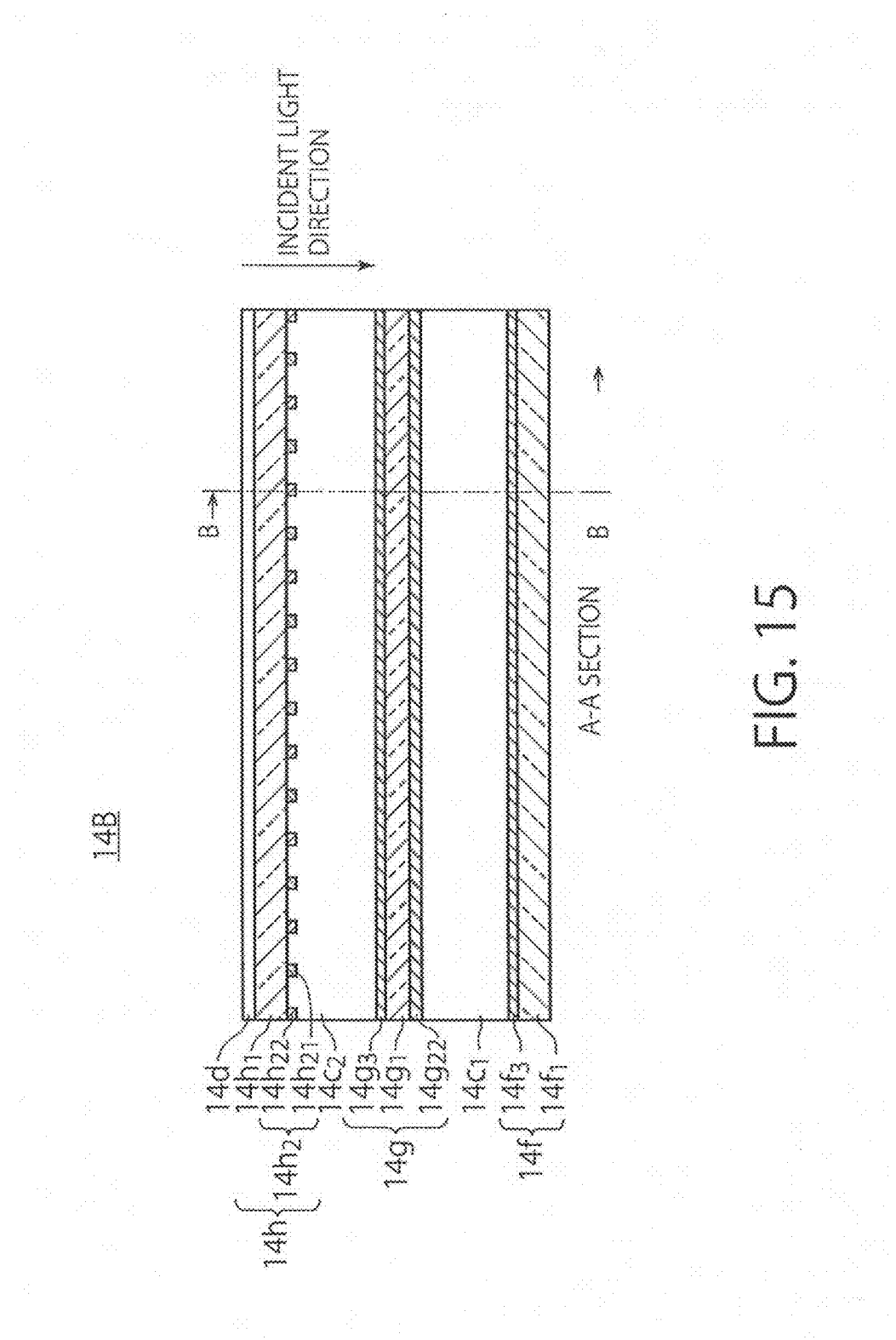
FIG. 15 is a cross-sectional view of a liquid crystal optical device according to the third embodiment.
Figure 16:
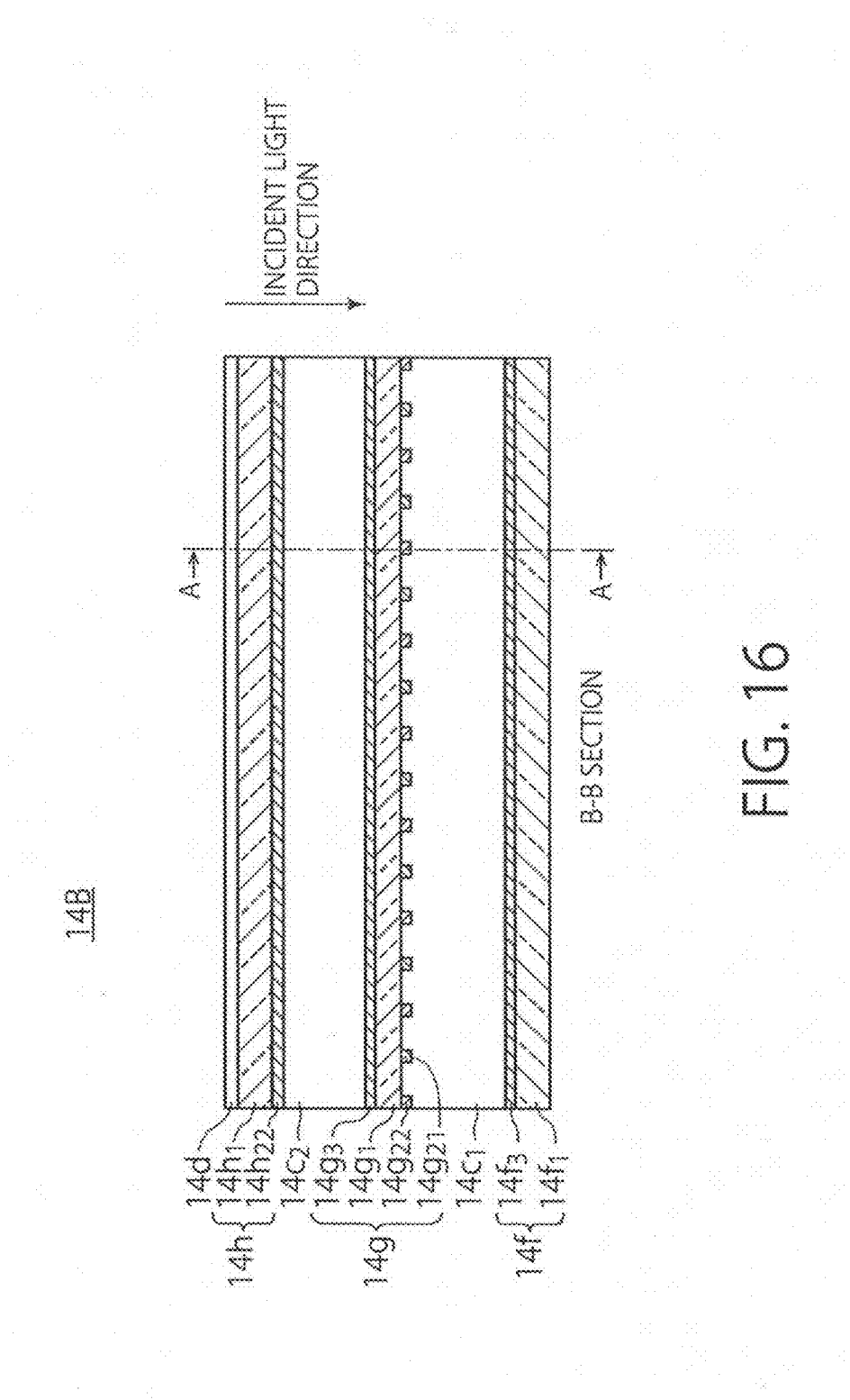
FIG. 16 is a cross-sectional view of the liquid crystal optical device according to the third embodiment.

A solid state imaging device according to the third embodiment will be described with reference to FIGS. 15 to 19. The solid state imaging device according to the third embodiment differs from that of the first embodiment in the structure of the liquid crystal optical device. FIGS. 15 and 16 show a specific example of a liquid crystal optical device 14B used in the solid state imaging device according to the third embodiment. FIGS. 15 and 16 correspond to the cross-sectional views shown in FIGS. 4(a) and 4(b) of the liquid crystal optical device 14 according to the first embodiment, respectively. FIG. 15 is a cross-sectional view taken along line A-A in FIG. 16, and FIG. 16 is a cross-sectional view taken along line B-B in FIG. 15.

A liquid crystal optical device 14B of the specific example according to the third embodiment includes an electrode unit 14f, an electrode unit 14g, an electrode unit 14h, liquid crystal layers $14c_1$, $14c_2$, and a polarizing plate 14d.

The electrode unit 14g is located between the electrode unit 14f and the electrode unit 14h. The liquid crystal layer $14c_1$ is located between the electrode unit 14f and the electrode unit 14g, and the liquid crystal layer $14c_2$ is located between the electrode unit 14g and the electrode unit 14h.

The polarizing plate $14d$ is located on a side of the electrode unit $14h$ opposite to the side where the liquid crystal layer $14c_2$ is located.

The electrode unit $14f$ has a substrate $14f_1$ that is transparent to light, and a plane electrode $14f_3$ formed on the substrate $14f_1$.

The electrode unit $14g$ includes a substrate $14g_1$ that is transparent to light, a plurality of electrode $14g_2$ in stripes on a side of the substrate $14g_1$ where the liquid crystal layer $14c_1$ is located, and a plane electrode $14g_3$ located on a side of the substrate $14g_1$ where the liquid crystal layer $14c_2$ is located. The electrodes $14g_2$ include electrodes $14g_{21}$ and electrodes $14g_{22}$ in stripes, to which different voltages are applied when the liquid crystal optical device 14B is in the lens state. The electrodes $14g_{21}$ and the electrodes $14g_{22}$ are alternately arranged.

The electrode unit $14h$ includes a substrate $14h_1$ that is transparent to light, and a plurality of electrodes $14h_2$ in stripes located on a side of the substrate $14h_1$ where the liquid crystal layer $14c_2$ is located. The electrodes $h_2$ include electrodes $14h_{21}$ and electrodes $14h_{22}$ in stripes, to which different voltages are applied when the liquid crystal optical device 14B is in the lens state. The electrodes $14h_{21}$ and the electrodes $14h_{22}$ are alternately arranged. Furthermore, the electrodes $14h_2$ in stripes extend in a direction that crosses the direction in which the electrodes $14g_2$ extend. In other words, the electrodes $14h_{21}$, $14h_{22}$ extend in a direction that crosses the direction in which the electrodes $14g_{21}$, $14g_{22}$ extend. In the third embodiment, the electrodes $14h_{21}$, $14h_{22}$ extend in a direction that crosses the direction in which the electrodes $14g_{21}$, $14g_{22}$ extend. An alignment film (not shown) is provided between the electrode unit $14f$ and the liquid crystal layer $14c_1$, between the electrode unit $14g$ and the liquid crystal layer $14c_1$, between the electrode unit $14g$ and the liquid crystal layer $14c_2$, and between the electrode unit $14h$ and the liquid crystal layer $14c_2$.

In the liquid crystal optical device 14B of the specific example of the third embodiment having the aforementioned structure, the plane electrode $14f_3$ and the electrodes $14g_2$ cause the liquid crystal layer $14c_1$ to function as a liquid crystal gradient index (GRIN) lens in the cross section shown in FIG. 16. Furthermore, the plane electrode $14g_3$ and the electrodes $14h_2$ cause the liquid crystal layer $14c_2$ to function as a liquid crystal GRIN lens in the cross section shown in FIG. 15. In this manner, the liquid crystal optical device 14B according to the third embodiment can switch between the lens state and the non-lens state by applying or eliminating a voltage. The use of the liquid crystal optical device 14B according to the third embodiment can improve the imaging property of the liquid crystal optical device when a voltage is applied thereto.

Figure 17:
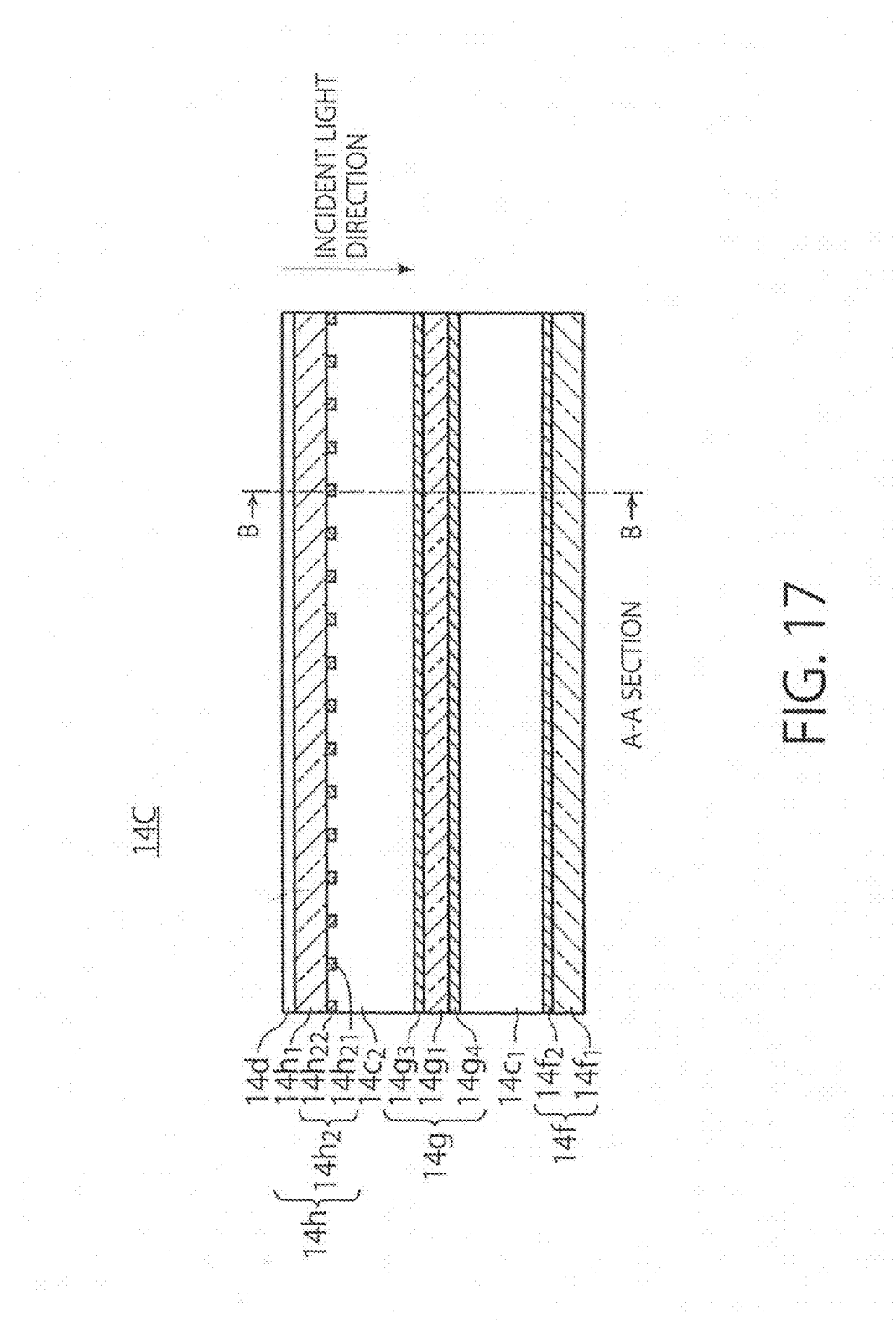
FIG. 17 is a cross-sectional view of a liquid crystal optical device of a further specific example of the third embodiment.
Figure 18:
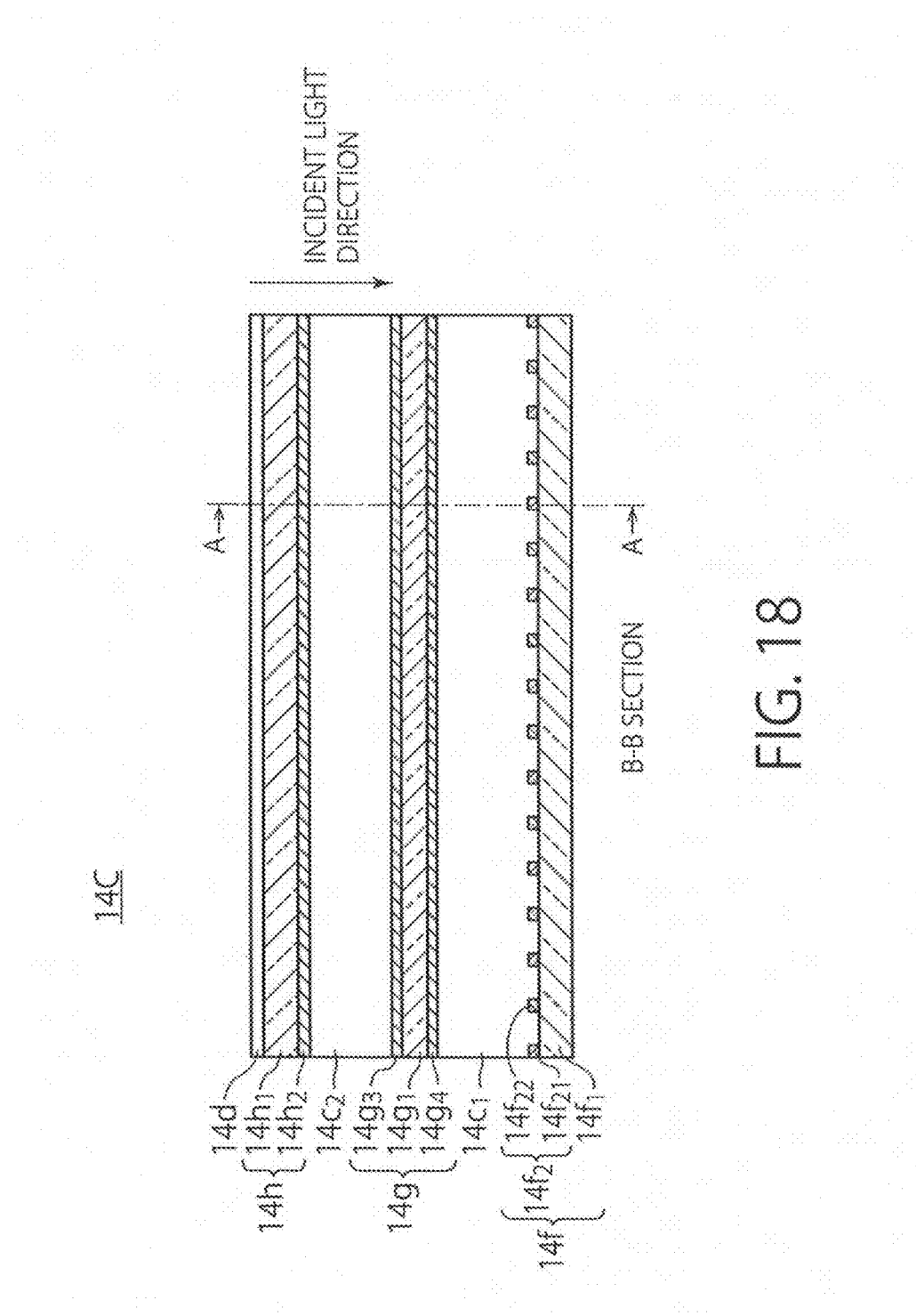
FIG. 18 is a cross-sectional view of the liquid crystal optical device of the further specific example of the third embodiment.

FIGS. 17 and 18 show a further specific example of a liquid crystal optical device 14C used in the solid state imaging device according to the third embodiment. FIGS. 17 and 18 correspond to the cross-sectional views in FIGS. 4 and 5 of the liquid crystal optical device 14 according to the first embodiment, respectively. FIG. 17 is a cross-sectional view taken along line A-A in FIG. 18, and FIG. 18 is a cross-sectional view taken along line B-B in FIG. 17.

The liquid crystal optical device 14C of the further specific example of the third embodiment is obtained by replacing the plane electrode $14f_3$ of the electrode unit $14f$ in the liquid crystal optical device 14B of the specific example shown in FIGS. 15 and 16 with a plurality of electrodes $14f_2$ in stripes, and replacing the electrodes $14g_2$ in stripes of the electrode unit $14g$ with a plane electrode $14g_4$. Thus, the electrode unit $14f$ includes a substrate $14f_1$ that is transparent to light, and a plurality of electrode $14f_2$ in stripes formed on the substrate $14f_1$. The electrodes $14f_2$ include electrodes $14f_{21}$, $14f_{22}$ in stripes. The electrodes $14f_{21}$ and the electrodes $14f_{22}$ are alternately arranged, and different voltages are applied thereto when the liquid crystal optical device 14C functions as a lens.

The electrode unit $14g$ includes a substrate $14g_1$ that is transparent to light, a plane electrode $14g_4$ placed on a side of the substrate $14g_1$ where the liquid crystal layer $14c_1$ is located, and a plane electrode $14g_3$ placed on a side of the substrate $14g_1$ where the liquid crystal layer $14c_2$ is located. Thus, the electrode unit $14g$ includes the substrate $14g_1$ and the plane electrodes $14g_3$, $14g_4$ that are placed on the sides of the substrate $14g_1$ and do not require patterning for forming electrodes in stripes. Accordingly, the liquid crystal optical device 14C can be manufactured more easily than the liquid crystal optical device 14B shown in FIGS. 15 and 16.

In the liquid crystal optical device 14C of the further specific example according to the third embodiment having such a structure, the electrodes $14f_2$ and the plane electrode $14g_4$ cause the liquid crystal layer $14c_1$ to function as a liquid crystal gradient index (GRIN) lens in a cross section shown in FIG. 18. Furthermore, the plane electrode $14g_3$ and the electrodes $14h_2$ cause the liquid crystal layer $14c_2$ to function as a liquid crystal GRIN lens in a cross section shown in FIG. 17. In this manner, the liquid crystal optical device 14C of the further specific example of the third embodiment can switch between the lens state and the non-lens state by applying or eliminating a voltage. The use of the liquid crystal optical device 14C of the further specific example of the third embodiment can improve the imaging property of the liquid crystal optical device when a voltage is applied.

Figure 19:
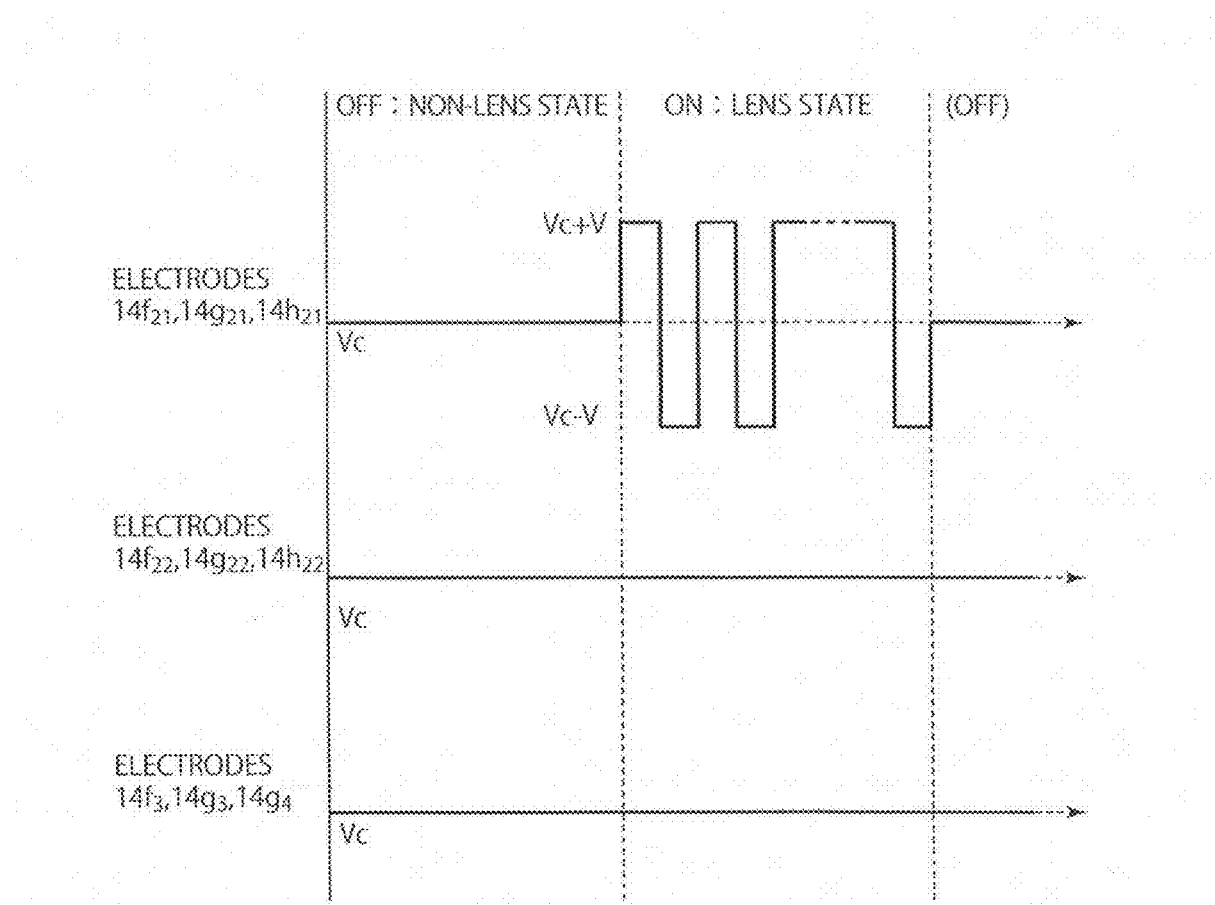
FIG. 19 is a diagram showing an example of voltages for driving the liquid crystal optical device according to the third embodiment.

FIG. 19 shows an example of voltage waveforms for driving the liquid crystal optical devices 14B and 14C. FIG. 19 shows voltage waveforms of the plane electrode $14f_3$ and the electrodes $14f_{21}$, $14f_{22}$ in stripes of the electrode unit $14f$, the plane electrodes $14g_3$, $14g_4$ and the electrodes $14g_{21}$, $14g_{22}$ in stripes of the electrode unit $14g$, and the electrodes $14h_{21}$, $14h_{22}$ of the electrode unit $14h$. An alternating voltage increased or decreased by a voltage V from a reference voltage Vc is applied to the electrodes $14f_{21}$, $14g_{21}$, and $14h_{21}$, and the reference voltage Vc is applied to the electrodes $14f_{32}$, $14g_{22}$, and $14h_{22}$ and the plane electrodes $14f_3$, $14g_3$, $14g_4$. The amplitude of the voltage applied to the liquid crystal layer $14c$ is ±V. In the case shown in FIG. 19, the voltage waveforms for the electrodes $14f_{21}$, the electrodes $14g_{21}$, and the electrodes $14h_{21}$ are rectangular, but any voltage having an ac waveform can be applied. An alternating voltage may be applied to the electrodes $14f_{22}$, $14g_{22}$, $14h_{22}$, and the plane electrodes $14f_3$, $14g_3$, $14g_4$ with a potential difference between those and the electrodes $14f_{21}$, $14g_{21}$, $14h_{21}$ being kept.

As in the case of the first embodiment, a plane electrode may be provided between the electrodes $14g_2$ in stripes and the substrate $14g_1$ transparent to light, and between the electrodes $14h_2$ in stripes and the substrate $14h_1$ transparent to light in the liquid crystal optical device 14C of the third embodiment. In such a case, an insulating film is provided between each plane electrode and the corresponding electrodes in stripes. Similarly, as in the case of the first embodiment, a plane electrode may be provided between the electrodes $14f_2$ in stripes and the substrate $14f_1$ transparent to light, and between the electrodes $14h_2$ in stripes and the substrate $14h_1$ transparent to light in the liquid crystal optical device 14C of the third embodiment. In such a case, an insulating film is provided between each of the plane electrodes and the corresponding electrodes in stripes. A film for improving the adhesion may be provided between each of the transparent substrates and the corresponding electrodes.

As described above, a liquid crystal optical device and a solid-state imaging device having a function of switching between an imaging mode for obtaining a distance to a subject in a depth direction and an imaging mode for obtaining a high-resolution two-dimensional image can be provided according to the third embodiment, as in the first embodiment.

The optical characteristics in the lens state of the liquid crystal optical devices according to the first to the third embodiments are improved in the order of the liquid crystal optical device 14A of the second embodiment, the liquid crystal optical device 14 of the first embodiment, and the liquid crystal optical devices 14B, 14C of the third embodiment.

When the liquid crystal optical devices are in the non-lens state, optical characteristics of the liquid crystal optical device 14A of the second embodiment are better than those of the liquid crystal optical devices 14B, 14C of the third embodiment.

The liquid crystal optical device 14A of the second embodiment can be manufactured more easily than the liquid crystal optical devices 14B, 14C of the third embodiment.

The liquid crystal optical devices 14B, 14C of the third embodiment is superior in easiness in driving, i.e., simplicity in the circuit, to the liquid crystal optical device 14 of the first embodiment.

Fourth Embodiment

A method of manufacturing the liquid crystal optical devices according to the first to the third embodiments will be described with reference to FIGS. 20(a) to 20(l), the method corresponding to the fourth embodiment. The method according to the fourth embodiment is, for example, for manufacturing the liquid crystal optical device 14 according to the first embodiment.

Figure 20:
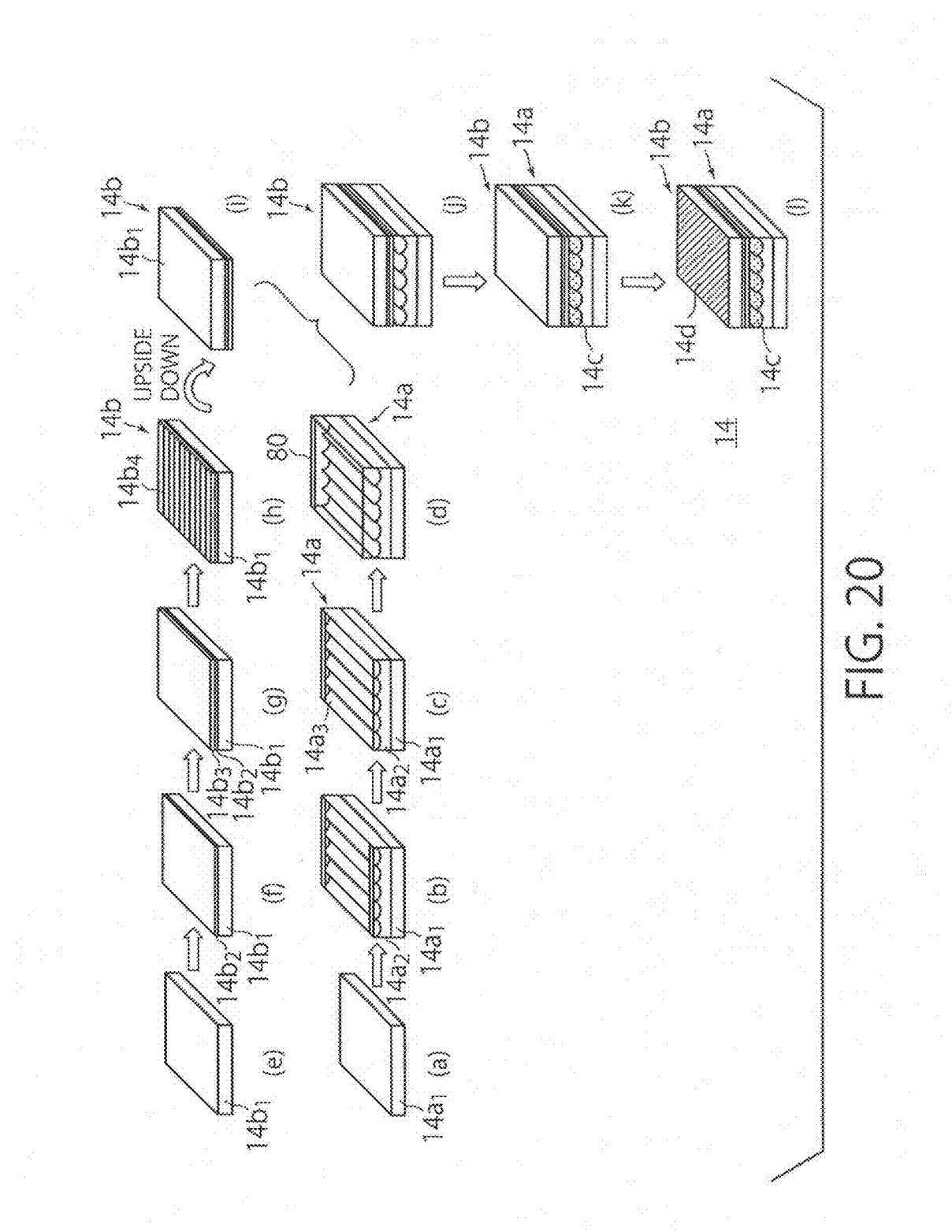
FIGS. 20(a) to 20(l) are perspective views showing a method of manufacturing a liquid crystal optical device according to the fourth embodiment.

First, a substrate $14a_1$ transparent to light is prepared, and a frame unit $14a_2$ is formed on the substrate $14a_1$ (FIGS. 20(a) and 20(b)). An electrode $14a_3$ is formed on the frame unit $14a_2$ to complete an electrode unit 14a (FIG. 20(c)). A sealing agent 80 is applied to the periphery portions of the frame unit $14a_2$ (FIG. 20(d)). Next, a substrate $14b_1$ transparent to light is prepared, and a plane electrode $14b_2$ is formed on the substrate $14b_1$ (FIG. 20(e), 20(f)). An insulating film $14b_3$ is formed on the plane electrode $14b_2$ (FIG. 20(g)). Electrodes $14b_4$ in stripes are formed on the insulating film $14b_3$ to complete an electrode unit 14b (FIG. 20(h)). Subsequently, the electrode unit 14b is turned upside down (FIG. 20(i)), and bonded to the electrode unit 14a, on which the sealing agent 80 is applied (FIG. 20(j)). Thereafter, liquid crystal are introduced and sealed between the electrode unit 14a and the electrode unit 14b to form a liquid crystal layer 14c (FIG. 20(k)). Then, a polarizing plate is bonded onto the substrate $14b_1$ of the electrode unit 14b to complete a liquid crystal optical device 14 (FIG. 20(l)). The liquid crystal optical devices according to the second and the third embodiments are manufactured in the same way.

Fifth Embodiment

Figure 21:
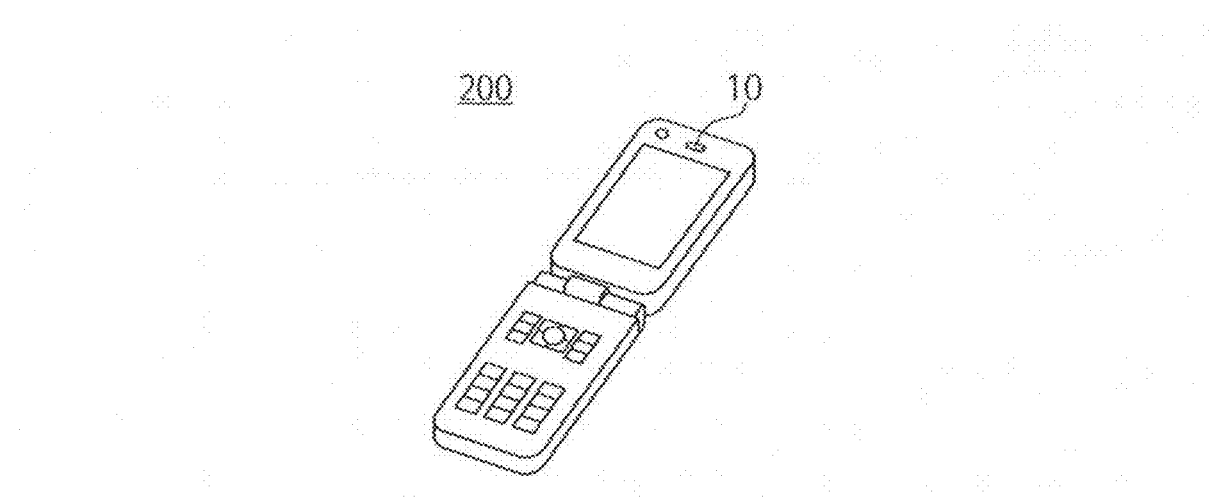
FIG. 21 is a perspective view showing a portable information terminal according to the fifth embodiment.

FIG. 21 shows a portable information terminal according to the fifth embodiment. The portable information terminal 200 according to the fifth embodiment includes a solid state imaging device 1 according to any of the first to the third embodiments. FIG. 21 shows the imaging module unit 10 of the solid state imaging device 1. It should be noted that FIG. 21 only shows an example of the portable information terminal.

According to the fifth embodiment, a portable information terminal having a function of switching between an imaging mode for obtaining a distance to a subject in a depth direction and an imaging mode for obtaining a high-resolution two-dimensional image can be provided.

The liquid crystal optical device used in the portable information terminal according to the fifth embodiment is any one of the liquid crystal optical devices according to the first to the third embodiments.

Sixth Embodiment

A display device according to the sixth embodiment will be described with reference to a block diagram shown in FIG. 22. The display device 300 according to the sixth embodiment is capable of switching between a two-dimensional image mode and a three-dimensional image mode, and includes a display panel 310, a drive circuit 320, and a liquid crystal optical device 330.

The display panel 310 includes a display screen in which pixels are arranged in a matrix form. A liquid crystal display panel of direct viewing type or projection type, a plasma display panel, a field emission display panel, or an organic EL display panel may also be used as long as pixels are arranged in a matrix form at respective positions within a display area on a plane.

The drive circuit 320 drives the display panel 310, sends video signals (data to be displayed) from the outside to the display panel 310 to assign the data to be displayed to the pixels of the display panel 310, thereby displaying a two-dimensional image or three-dimensional image on the display panel 310. The drive circuit 320 may be integrated with the display panel 310, or located outside the display panel 310.

The liquid crystal optical device 330 is located in front of the display panel 310 to control light rays from the pixels of the display panel 310 to have a variable focal point. The liquid crystal optical device 330 is, for example, any of the liquid crystal optical devices 14, 14A, 14B, and 14C according to one of the first to the third embodiments, and is capable of switching between the function of allowing light rays to travel straight and the function of lens. For example, if the display device is to display two-dimensional images, the function of allowing light rays to travel straight is used, and if the display device is to display three-dimensional images, the function of lens is used. The switching between the function of allowing light rays to travel straight and the function of lens may be automatically performed by the drive circuit 340 based on the video signals inputted to the drive circuit 320, or based on an instruction signal sent from a viewer to the drive circuit 340 by using a remote controller 350. In such cases, the display panel 310 or drive circuit 320 of the display device 300 preferably includes a function of estimating or detecting depth information from two-dimensional video signals, if the video signals sent from the outside are two-dimensional video signals, by using well-known techniques, and generating three-dimensional video signals using the estimated or detected depth information. The estimation or detection of the depth information is performed by, for example, obtaining motion vectors of images.

As in the case of the first embodiment, a plurality of pixels (pixel block) is assigned to each lens element of the liquid crystal optical device 330. The liquid crystal optical device 330 capable of switching between a function of allowing light rays to travel straight and a function of lens, used in a display device capable of displaying three-dimensional images, allows two-dimensional images to be displayed without reducing the resolution.

According to the sixth embodiment, a display device having a function of switching between a display mode for displaying three-dimensional images and a display mode for displaying high-resolution two-dimensional images can be provided.

Seventh Embodiment

Figure 24:
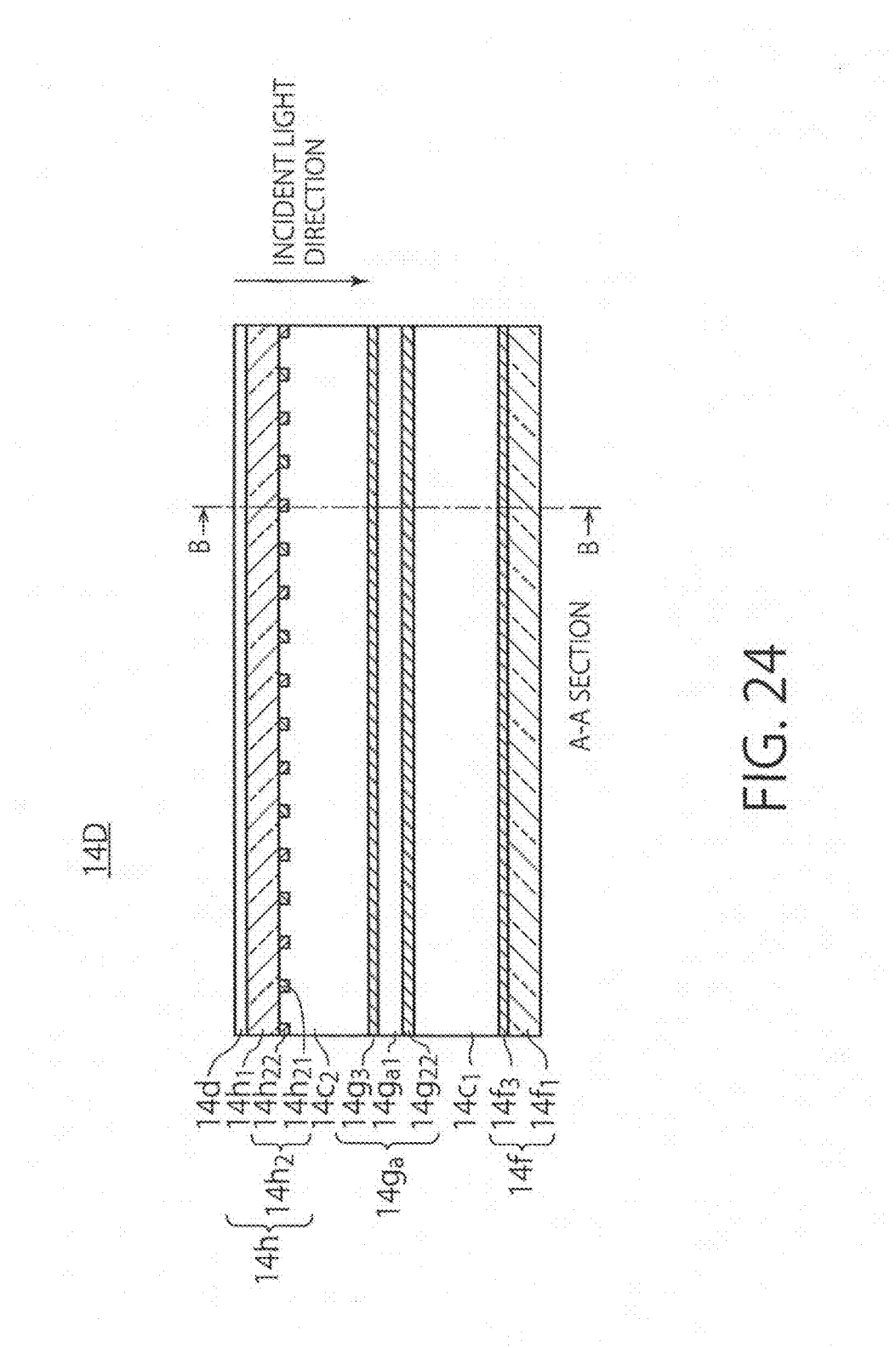
FIG. 24 is a cross-sectional view showing a liquid crystal optical device of a specific example of the seventh embodiment.
Figure 25:
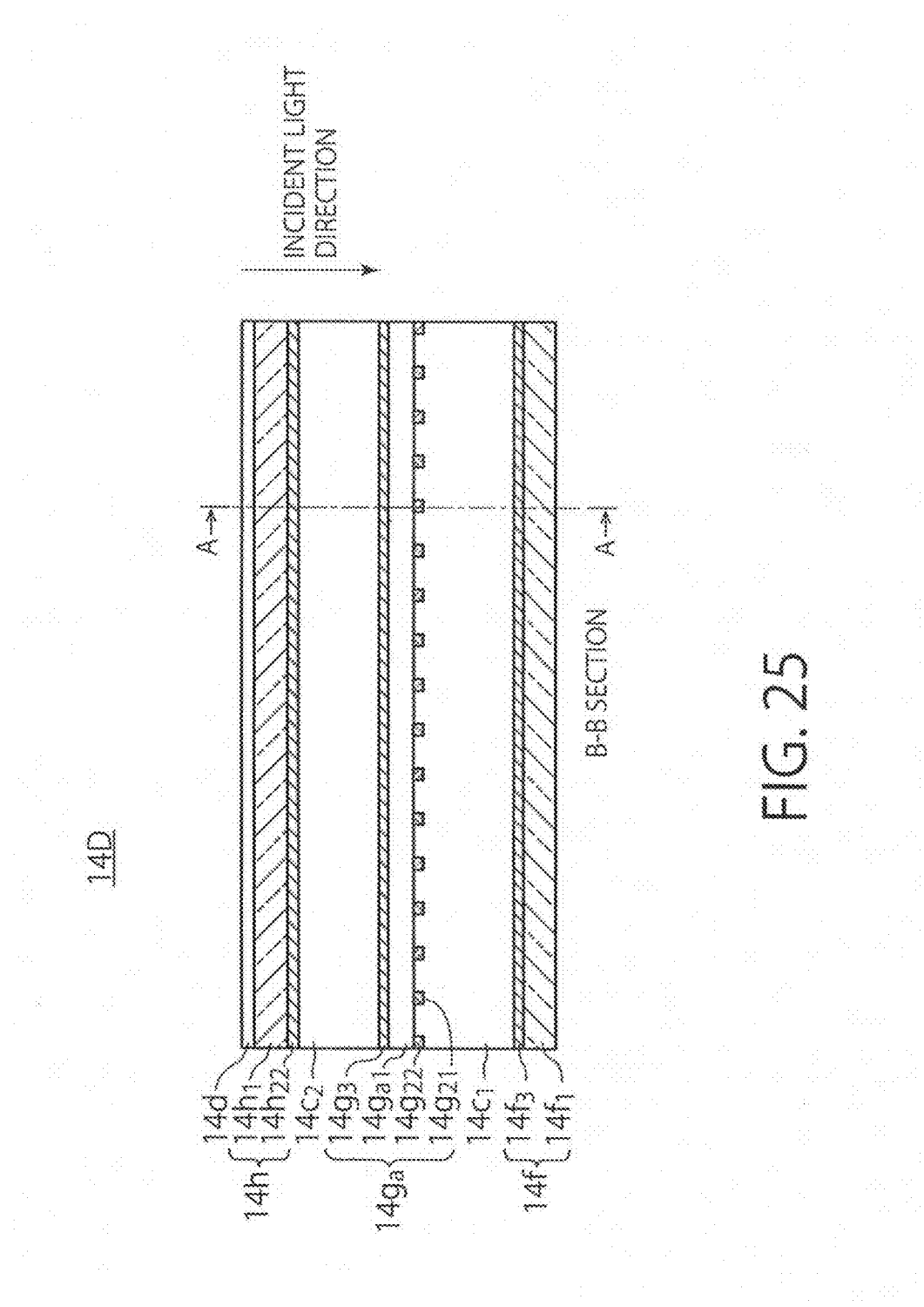
FIG. 25 is a cross-sectional view showing the liquid crystal optical device of the specific example of the seventh embodiment.

A solid state imaging device according to the seventh embodiment will be described with reference to FIGS. 24 to 26. The solid state imaging device according to the seventh embodiment differs from the solid state imaging device according to the third embodiment in the structure of the liquid crystal optical device. FIGS. 24 and 25 show a specific example of a liquid crystal optical device 14D used in the solid state imaging device according to the seventh embodiment. FIGS. 24 and 25 correspond to the cross-sectional views of FIGS. 15 and 16 showing the liquid crystal optical device 14 according to the third embodiment, respectively. FIG. 24 is a cross-sectional view taken along line A-A in FIG. 25, and FIG. 25 is a cross-sectional view taken along line B-B in FIG. 24.

The liquid crystal optical device 14D of the specific example according to the seventh embodiment is obtained by replacing the electrode unit 14g of the liquid crystal optical device 14B according to the third embodiment shown in FIGS. 15 and 16 with an electrode unit 14ga. The electrode unit 14ga is obtained by replacing the substrate $14g_1$ transparent to light with a polarization rotating plate $14ga_1$.

Figure 26:
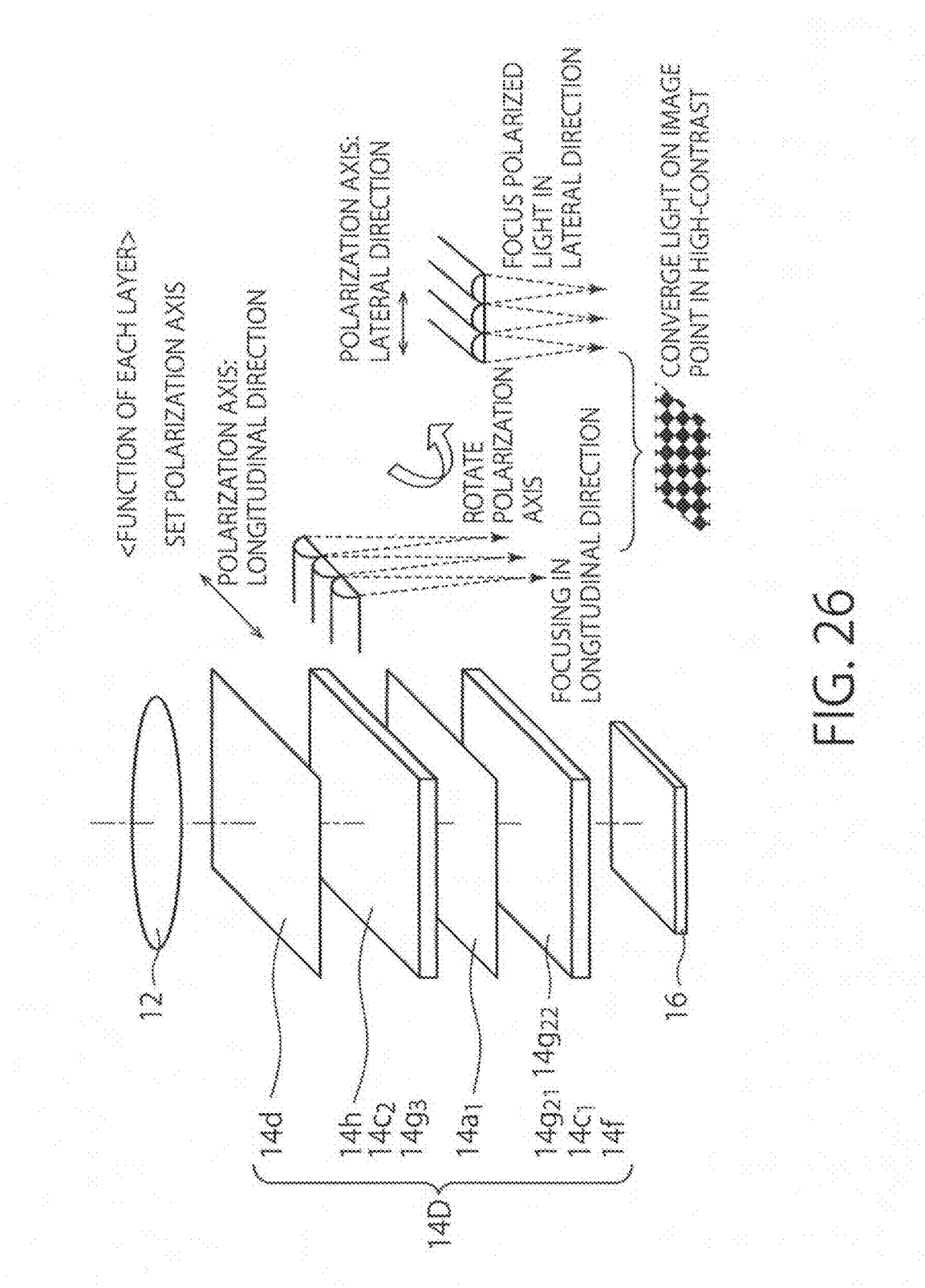
FIG. 26 is a schematic diagram for explaining a solid state imaging device according to the seventh embodiment.

The liquid crystal optical device 14D of the specific example of the seventh embodiment is used in, for example, a solid state imaging device shown in FIG. 26. In this solid state imaging device, an image from a subject is formed by a main lens 12, and re-imaged on an imaging element 16 by the liquid crystal optical device 14D. In other words, image ray representing an image formed by the main lens 12 is polarized by a polarizing plate 14d to become, for example, linearly polarized light. The polarizing plate 14d is arranged so that a first lens including an electrode unit 14h, a liquid crystal layer $14c_2$, and a plane electrode $14g_3$ has a polarization axis in a depth direction of FIG. 26. The liquid crystal layer $14c_2$ is arranges so that the initial alignment of the long axes of liquid crystal molecules at the interface to which the polarized light is incident is substantially along the depth direction. The electrode unit 14h is arranged so that electrodes extend in a lateral direction that is perpendicular to the depth direction. A voltage is applied to the electrode unit 14h (electrodes $14h_{21}$, $14h_{22}$) and a plane electrode $14g_3$. As a result, the linearly polarized light from the polarizing plate 14d is focused by the first lens in the depth direction in FIG. 26. The polarization axis of the light focused in the depth direction is rotated by a rotating polarizer $14ga_1$ in the lateral direction in FIG. 26 that is perpendicular to the depth direction. Polarized light having a polarization axis in the lateral direction in FIG. 26 from the rotating polarizer $14ga_1$ is incident to a second lens including electrodes $14g_{21}$, $14g_{22}$, a liquid crystal layer $14c_1$, and an electrode unit 14f. The liquid crystal layer $14c_1$ is arranged so that the initial alignment of the long axes of liquid crystal molecules at the interface to which the polarized light is incident is substantially in the lateral direction. The electrodes $14g_{21}$, $14g_{22}$ are arranged so that electrodes extend in the depth direction. A voltage is applied to the electrodes $14g_{21}$, $14g_{22}$ and the electrode unit 14f. As a result, the light in which the polarization axis is rotated by the rotating polarizer $14ga_1$ is focused by the second lens in the lateral direction. In this manner, high-contrast focusing of light on a point can be performed.

Figure 27:
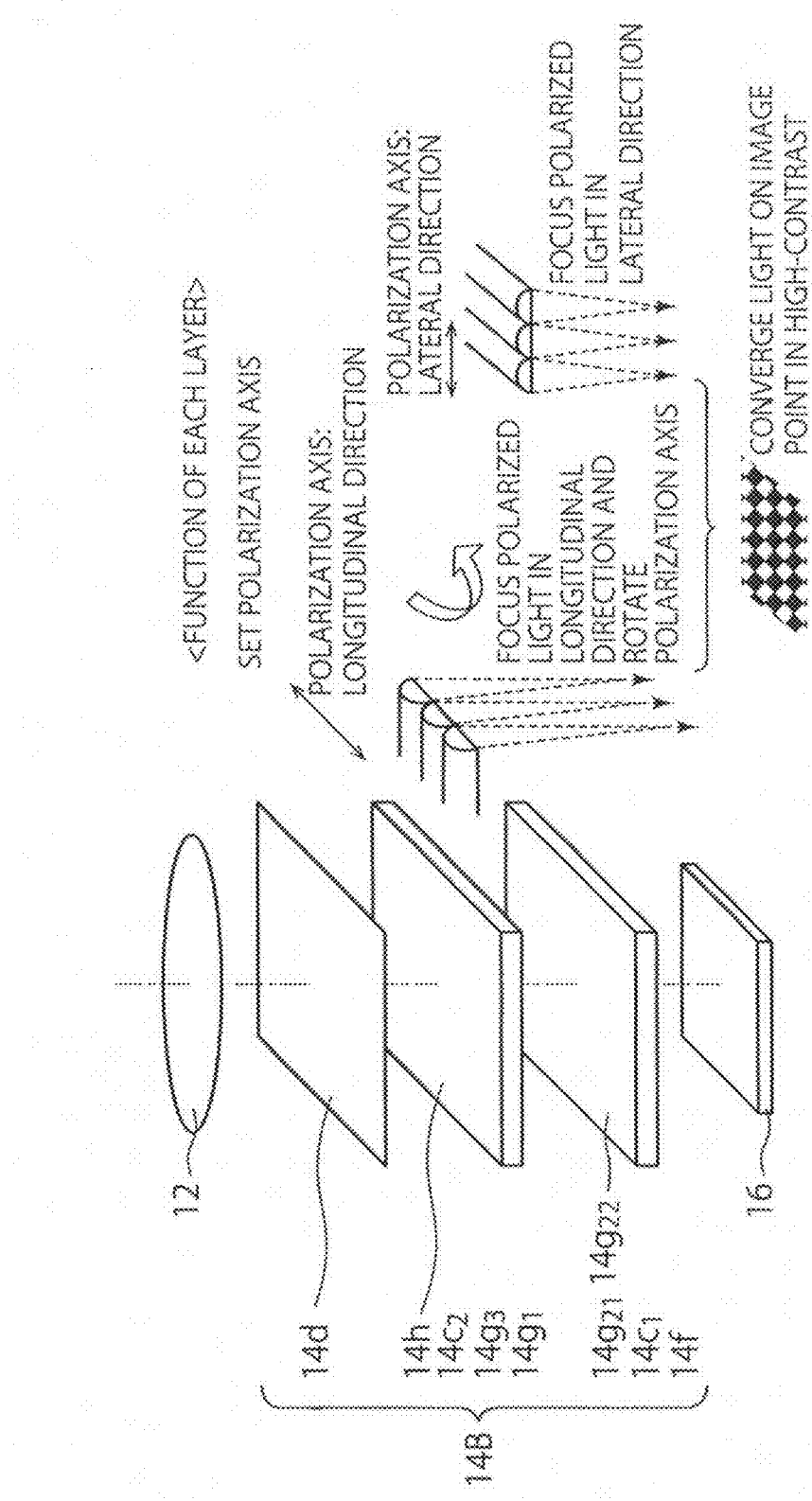
FIG. 27 is a schematic diagram for explaining a modification of the solid state imaging device according to the third embodiment.

High-contrast focusing of light on a point can also be performed if a voltage is applied to the liquid crystal optical device 14B of the specific example of the third embodiment shown in FIGS. 15 and 16 so that the liquid crystal layer of one of the first lens including the electrode unit 14h, the liquid crystal layer $14c_2$, and the plane electrode $14g_3$, and the second lens including the electrodes $14g_{21}$, $14g_{22}$, the liquid crystal layer $14c_1$, and the electrode unit 14f has a twisted (TN) alignment (FIG. 27). In this case, the direction of the polarization axis of the polarizing plate 14d, the initial alignment of the long axes of the liquid crystal molecules of the liquid crystal layer $14c_2$ at the interface to which polarized light is incident, and the direction in which the electrodes of the electrode unit 14h extend are substantially parallel to each other. These directions are substantially perpendicular to the initial alignment of the long axes of the liquid crystal molecules of the liquid crystal layer $14c_1$ at the interface to which the polarized light is incident, and the direction in which the electrode unit electrodes $14g_{21}$, $14g_{22}$ extend.

Figure 28:
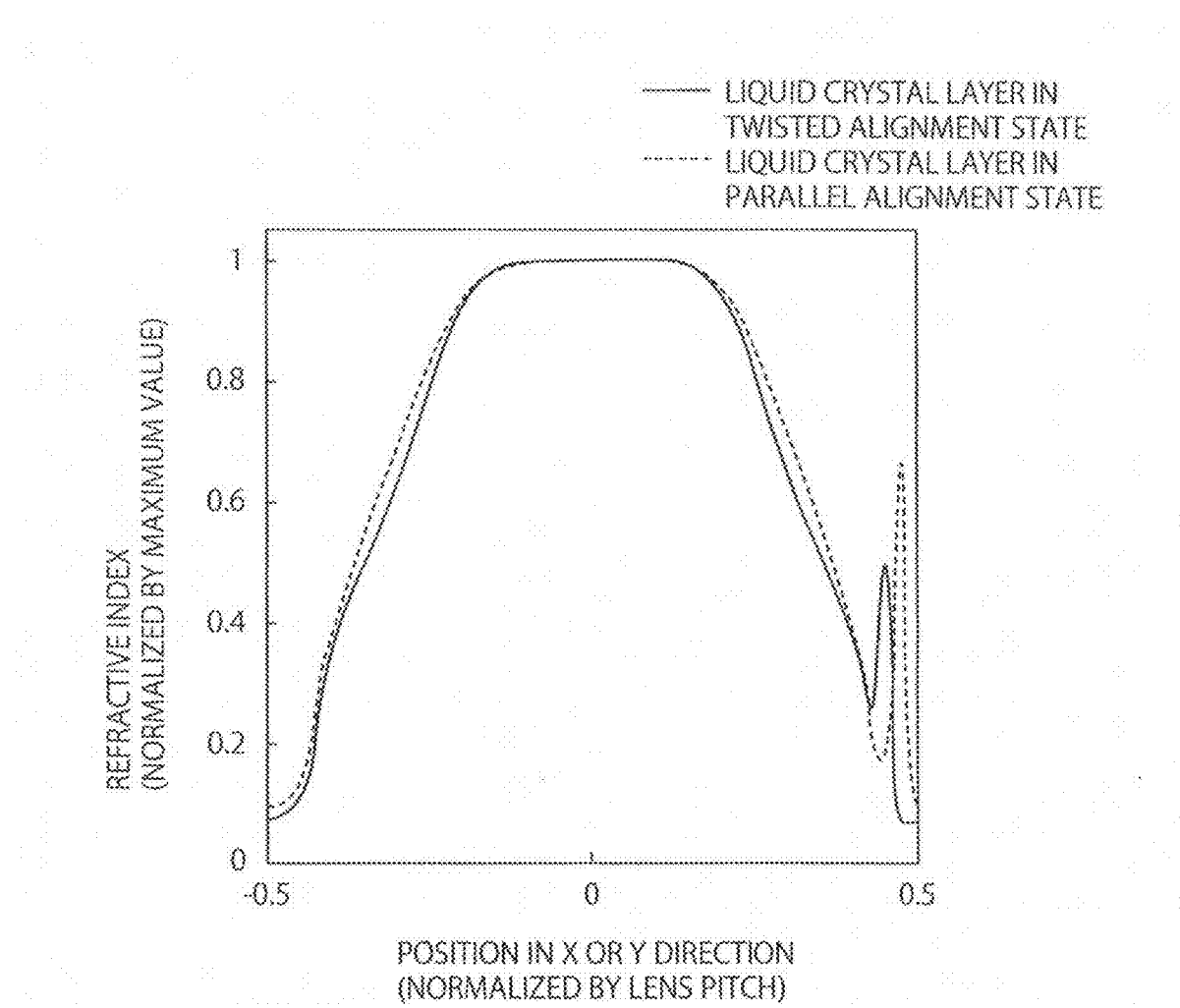
FIG. 28 is a plot indicating the distributional characteristics of a refractive indexices when applying voltages to the liquid crystal optical devices according to the seventh embodiment.

FIG. 28 shows plotting indicating the characteristics of a refractive index distribution when a voltage is applied to the liquid crystal optical device according to the seventh embodiment. FIG. 28 shows the distributions in a lens unit with two types of liquid crystal alignments, the dot line indicating a parallel alignment mode generally employed, and the solid line indicating a twisted alignment mode. On the lateral axis of the plotting, 0 is at the center of a lens unit, and ±0.5 correspond to the ends of the lens unit. The longitudinal axis of the plotting indicates a relative refractive index normalized by the values at the time when no voltage is applied.

FIG. 28 shows that the curves of the solid line and the dotted line substantially match each other, and the changes in the refractive index outside the lens unit (the degrees of decrease at the end portions) are in the same level. Thus, the use of the twisted alignment mode instead of the parallel alignment mode leads to a similar light focusing effect. It is known that a rapid increase in refractive index at the end of the plotting (about 0.5 on the longitudinal axis) is caused by alignment defects. The alignment defects are caused when the gradient of natural orientation of liquid crystal molecules determined by the alignment layer does not match the gradient electric field generated at an edge of electrode in a stripe when a voltage is applied, resulting in horizontal rotation of the orientation of liquid crystal molecules (i.e. alignment defects) induced at the boundary of the two regions with the opposing gradient of the orientation. The region in which the alignment defects occurs is preferably as narrow as possible since the desired lens effect cannot be obtained in the area where the refractive index locally increases. Although the place where the alignment defects occur differs between the cases represented by the solid line and the dotted line, the length of the area is in the same level. Thus, if the twisted alignment mode is employed instead of the parallel alignment mode, the influence to the lens characteristics is about the same.

In the liquid crystal optical device 14D according to the seventh embodiment having such a structure, the plane electrode $14f_3$ and the electrodes $14g_2$ cause the liquid crystal layer $14c_1$ to function as a liquid crystal gradient index (GRIN) lens in the cross section shown in FIG. 25. Furthermore, the plane electrode $14g_3$ and the electrodes $14h_2$ cause the liquid crystal layer $14c_2$ to function as a liquid crystal GRIN lens in the cross section shown in FIG. 24. As described above, the liquid crystal optical device 14D according to the seventh embodiment is capable of switching between the lens state and the non-lens state by applying or eliminating a voltage. The use of the liquid crystal optical device 14D according to the seventh embodiment can improve the imaging property of the liquid crystal optical device when a voltage is applied.

Figure 22:
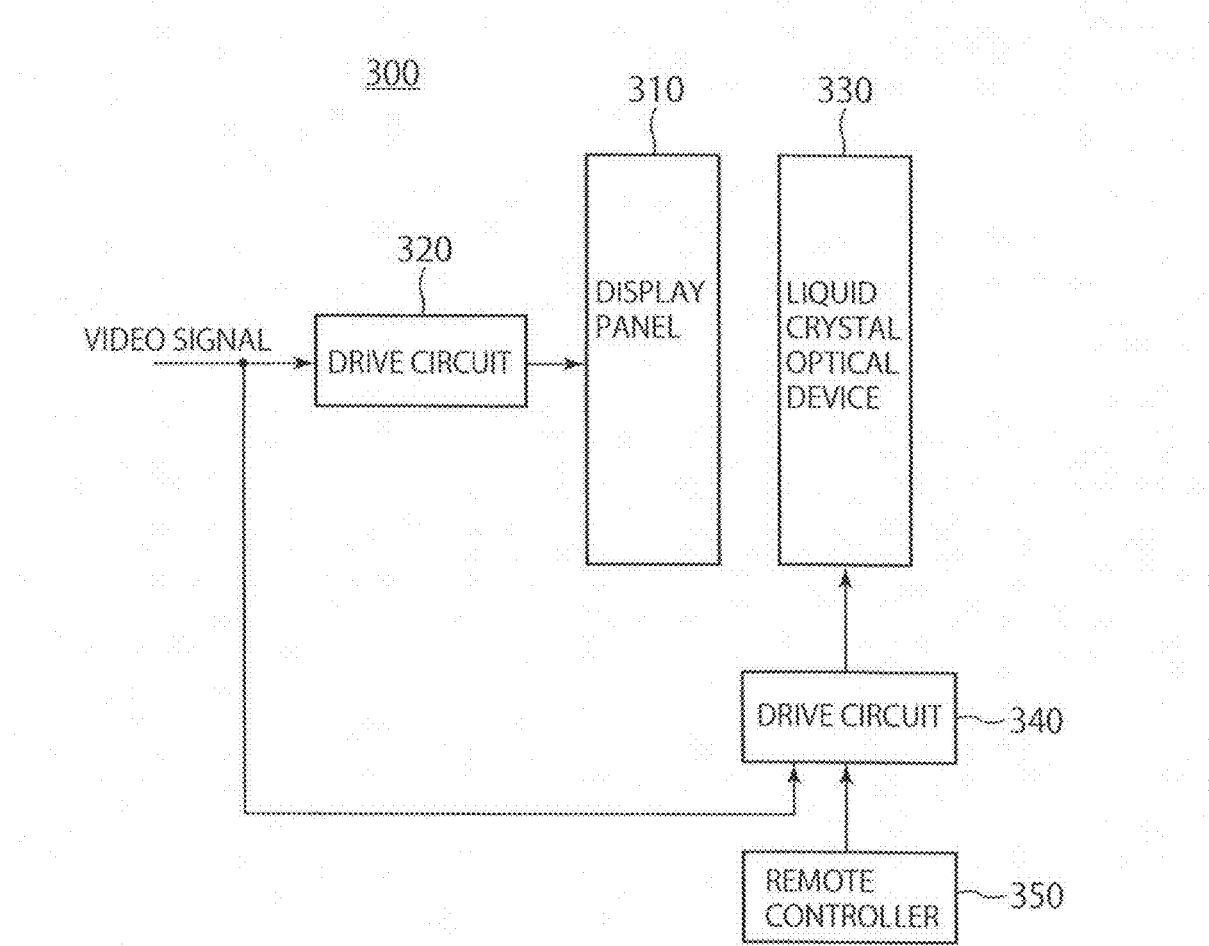
FIG. 22 is a block diagram showing a display device according to the sixth embodiment.

As in the case of the liquid crystal optical device according to any of the first to the third embodiments, the liquid crystal optical device according to the seventh embodiment can be used in the portable information terminal shown in FIG. 21 and the display device shown in FIG. 22.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and spirit of the inventions.

The invention claimed is:

1. A liquid crystal optical device comprising:
a first electrode unit including a first substrate having a first surface, the first substrate being transparent to light, a first electrode disposed on a side of the first surface of the first substrate, and a light-transmitting layer disposed between the first substrate and the first electrode, the first electrode being transparent to light, the light-transmitting layer including recesses disposed on a surface facing the first electrode, the recesses being arranged in a first direction that is parallel to the first surface, and extending in a second direction that crosses the first direction and is parallel to the first surface, and the first electrodes being directly in contact with surfaces of the recesses;
a second electrode unit including a second substrate having a second surface that faces the first surface, the light-transmitting layer and the first electrode being disposed between the first substrate and the second substrate, the second substrate being transparent to light, and second and third electrodes disposed on the second surface and separated from each other, the second and third electrodes being arranged in the second direction and extending along the first direction, one of the third electrodes being located between adjacent two of the second electrodes, one of the second electrodes being located between adjacent two of the third electrodes;
a liquid crystal layer located between the first electrode unit and the second electrode unit;
a first polarizing plate located an opposite side of the second electrode unit from the liquid crystal layer; and
a drive unit that applies voltages to the first electrode and the second and third electrodes,
wherein a first portion of the first electrode is on one of the recesses, a second portion of the second surface is located between the adjacent two of the second electrodes, a third portion of the liquid crystal layer that is located between the first portion and the second portion forms a unit of lenses, the unit of lenses having a function of focusing light in the first and second directions respectively.

2. The device according to claim 1, wherein the second electrode unit further includes a plane electrode that is transparent to light and located between the second substrate and the second and third electrodes, and an insulating film that is transparent to light and located between the plane electrode and the second electrodes, the second and third electrodes overlap a portion of the plane electrode respectively.

3. The device according to claim 1, wherein the second electrode unit further includes a fourth electrode located between the second and third electrodes, and
the drive unit applies different voltages to the second and third electrodes and the fourth electrode.

4. The device according to claim 1, wherein the second electrode unit is thinner than the first electrode unit.

5. The device according to claim 1, wherein the lenses are squarely arranged.

* * * * *